(12) United States Patent
Schulz et al.

(10) Patent No.: US 11,754,104 B2
(45) Date of Patent: Sep. 12, 2023

(54) COMPONENT WITH TOLERANCE COMPENSATION FUNCTION

(71) Applicants: Böllhoff Verbindungstechnik GmbH, Bielefeld (DE); KVT Bielefeld GmbH, Bielefeld (DE)

(72) Inventors: Detlef Schulz, Bielefeld (DE); Michael Stumpf, Bielefeld (DE); Dirk Kortmann, Bielefeld (DE)

(73) Assignees: Böllhoff Verbindungstechnik GmbH, Bielefeld (DE); KVT Bielefeld GmbH, Bielefeld (DE)

( * ) Notice: Subject to any disclaimer, the term of this patent is extended or adjusted under 35 U.S.C. 154(b) by 527 days.

(21) Appl. No.: 16/966,219

(22) PCT Filed: Jan. 29, 2019

(86) PCT No.: PCT/EP2019/052117
§ 371 (c)(1),
(2) Date: Jul. 30, 2020

(87) PCT Pub. No.: WO2019/149695
PCT Pub. Date: Aug. 8, 2019

(65) Prior Publication Data
US 2021/0048052 A1     Feb. 18, 2021

(30) Foreign Application Priority Data
Jan. 30, 2018 (DE) .................. DE102018102045.7

(51) Int. Cl.
*F16B 5/02*      (2006.01)
*F16B 37/04*      (2006.01)
(Continued)

(52) U.S. Cl.
CPC .......... *F16B 5/0233* (2013.01); *F16B 37/048* (2013.01); *B25B 27/0007* (2013.01); *F16B 5/02* (2013.01); *F16B 37/122* (2013.01)

(58) Field of Classification Search
CPC ........ F16B 5/02; F16B 5/0233; F16B 37/048; F16B 37/122; B25B 27/0007; Y10T 403/75; B60R 16/0215
(Continued)

(56) References Cited

U.S. PATENT DOCUMENTS 3,640,655 A    2/1972   Wallace
6,193,456 B1 *   2/2001   Stumpf ................. F16B 37/122
                                                   411/456
(Continued)

FOREIGN PATENT DOCUMENTS

CN      104271964 A    1/2015
DE      594982 C    3/1934
(Continued)

OTHER PUBLICATIONS

English Translation of the International Preliminary Report on Patentability for PCT/EP2019/052117 dated Aug. 4, 2020, 11 pages.
(Continued)

*Primary Examiner* — Roberta S Delisle
(74) *Attorney, Agent, or Firm* — Reising Ethington P.C.

(57) ABSTRACT

A component has a base bushing, which has a first axial end and an opposite second axial end and a first inner diameter, wherein the base bushing is equipped with a first internal thread with a first thread direction, and has a fastening bushing, which has a third axial end and an opposite fourth axial end and a second inner diameter. The fastening bushing is equipped with a second internal thread with a second thread direction which is opposite to the first thread direction, wherein the second inner diameter is smaller than the
(Continued)

Figure 1:
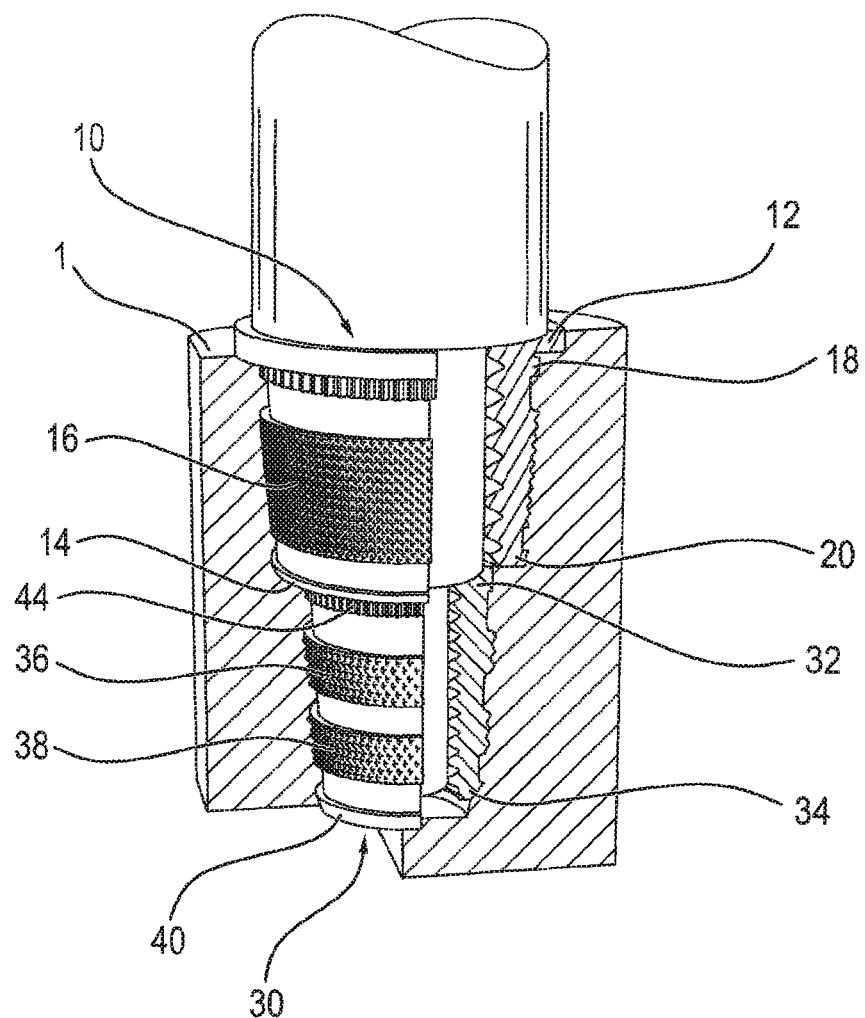

first inner diameter and the base bushing and the fastening bushing are separate elements and are arranged coaxially with respect to one another in the component. Alternatively, the base bushing and the fastening bushing are formed as a single piece.

21 Claims, 16 Drawing Sheets

(51) Int. Cl.
*B25B 27/00* (2006.01)
*F16B 37/12* (2006.01)

(58) Field of Classification Search
USPC .............. 411/103, 333–334, 427, 432, 546; 16/2.1, 2.2
See application file for complete search history.

(56) References Cited

U.S. PATENT DOCUMENTS

| | | | |
|---|---|---|---|
| 6,267,527 B1 | 7/2001 | Miller | |
| D456,700 S | 5/2002 | Miller et al. | |
| 6,454,502 B1* | 9/2002 | Cosenza | F16B 5/02 411/34 |
| 6,692,207 B1* | 2/2004 | Bailey | F16B 37/122 411/455 |
| 6,776,566 B2 | 8/2004 | Kobusch et al. | |
| 6,789,993 B2* | 9/2004 | Ozawa | F16B 33/02 411/432 |
| 7,025,552 B2 | 4/2006 | Grubert et al. | |
| 7,891,927 B2* | 2/2011 | Burger | F16B 5/0233 411/908 |
| 8,066,465 B2 | 11/2011 | Figge et al. | |
| 9,771,962 B2 | 9/2017 | Metten et al. | |
| 9,790,981 B2 | 10/2017 | Stumpf et al. | |
| 2002/0021948 A1* | 2/2002 | Stumpf | F16B 37/122 411/180 |
| 2004/0099339 A1 | 5/2004 | Miller | |
| 2005/0053449 A1* | 3/2005 | Grubert | F16B 5/025 411/546 |
| 2008/0226413 A1* | 9/2008 | Stephen | F16B 5/0208 411/103 |
| 2009/0080998 A1* | 3/2009 | Nagayama | F16B 39/284 411/432 |
| 2011/0070047 A1* | 3/2011 | Martin | F16B 37/122 411/178 |
| 2015/0023754 A1* | 1/2015 | Liu | F16B 37/125 411/103 |
| 2015/0023757 A1* | 1/2015 | Chang | F16B 37/048 411/173 |
| 2015/0337886 A1* | 11/2015 | Coronado | B23P 19/04 29/525.02 |

FOREIGN PATENT DOCUMENTS

| | | |
|---|---|---|
| DE | 7119603 U | 8/1971 |
| DE | 2303288 A1 | 8/1973 |
| DE | 3540188 A1 | 5/1987 |
| DE | 20314003 U1 | 11/2003 |
| DE | 202006012493 U1 | 11/2006 |
| DE | 202009005298 U1 | 6/2009 |
| DE | 102012102906 A1 | 10/2013 |
| EP | 1304489 B1 | 8/2005 |
| GB | 1396775 A * | 6/1975 ........... B29C 66/474 |
| WO | WO2015028680 A1 | 3/2015 |

OTHER PUBLICATIONS

CN Office Action for CN Application No. 201980011065.7 dated Oct. 15, 2021 (22 pages).
Written Opinion & International Search Report for PCT/EP2019/052117 dated May 17, 2019, 20 pages.

* cited by examiner

COMPONENT WITH TOLERANCE COMPENSATION FUNCTION

1. TECHNICAL FIELD

The present disclosure is related to the field of tolerance compensation arrangements and is directed to a component with a base bushing and a fastening bushing, a connection between a first and a second component with a distance in-between, an assembly for a tolerance compensation arrangement, a setting system for manufacturing the component with base bushing and fastening bushing, a manufacturing method for a component with base bushing and fastening bushing as well as a corresponding fastening method.

2. BACKGROUND

Tolerance compensation arrangements or fastening arrangements with tolerance compensation functions as well as their functionality are generally known in the prior art. Such tolerance compensation arrangements usually consist of a base element as well as an adjusting element with dragging element arranged therein, a fastening screw and a fastening nut intended for fastening the screw.

The base element and the adjusting element comprise a thread pairing of a first thread direction, for example a left-handed thread. For this purpose, the base element comprises an inner thread and the adjusting element comprises an outer thread. The fastening screw and the fastening nut comprise a thread pairing of a second thread direction, which is opposite to the first thread direction. That means that in the afore-mentioned example, the second thread direction would be defined by a right-handed thread. For this purpose, the fastening nut comprises an inner thread and the fastening screw comprises an outer thread in a known way. In use, first of all, the base element, usually with an adjusting element mounted therein, must be fastened at a first component. The fastening takes place in an opening of the component, with the base element for example comprising protrusions at its outer side, the protrusions constituting a bayonet catch. In this way, the base element with adjusting element arranged therein can be inserted into an opening of the first component and be fixed by means of rotating. It already becomes obvious from this approach of installing that the base element has a height that is larger than a thickness of the component. Furthermore, the component in which the base element is supposed to be fixed must be accessible from at least one side.

Now, in order to fasten a second component at a distance to the first component, the fastening screw is plugged through an opening in the second component, so that it is in a friction-locking connection with the dragging element. When the fastening screw is rotated according to its thread direction, the adjusting element is rotated out of the base element via the dragging element due to the opposite thread direction, until it comes into contact with and abuts the second component. When the fastening screw is now further rotated, it overcomes the torque provided by the dragging element, runs through the dragging element and projects from the base element. Now, the fastening nut can be screwed onto the fastening screw, thereby fixing the fastening screw.

In a known alternative, the fastening element and the base element are provided by a blind rivet nut. A corresponding tolerance compensation arrangement is described in EP 1 304 489 B1.

As can be seen from the above explanations, both components must be accessible from both sides in order to be able to mount and use the tolerance compensation arrangement. Furthermore, the base element is typically fastened at components which have a thickness that is smaller than a height of the base element, so that the base element is typically clipped in, locked in or can be fastened detachably in another way in a component opening, often nondestructive, and projects from at least one side of the corresponding component.

It is the object of at least some implementations of the present invention to provide a component that is prepared and optimized for the use of a tolerance compensation arrangement. In the same way, it is an object of at least some implementations of the present invention to provide a corresponding assembly, a connection between two components, a setting system as well as corresponding manufacturing and fastening methods.

3. SUMMARY

The above object is solved by a component, a connection between a first component and a second component with a distance in-between, an assembly, a setting system for manufacturing a component, a manufacturing method for a component as well as a fastening method for two components at each other. Further embodiments and further developments are set forth in and apparent from the following description, the drawings as well as the appending claims.

In a first alternative, a component comprises a base bushing having a first axial end and an opposite second axial end as well as a first inner diameter, with the base bushing being provided with a first inner thread of a first thread direction, and a fastening bushing having a third axial end and an opposite fourth axial end as well as a second inner diameter, with the fastening bushing being provided with a second inner thread of a second thread direction being opposite to the first thread direction, wherein the second inner diameter is smaller than the first inner diameter and the base bushing and the fastening bushing are separate elements and arranged coaxially to each other in the component.

The component may be a thick-walled component. In this connection, thick-walled means that at least in the portion in which the base bushing and the fastening bushing are present, the component has a thickness which allows that the fastening bushing is completely and the base bushing is at least partially arranged or inserted therein. That means that the fastening bushing with the third and the fourth axial end is arranged in the component or inserted therein as well as at least the second axial end of the base bushing that is arranged adjacent to the third axial end of the fastening bushing. Besides an overall thick-walled component, this can for example also be achieved by a component with mass accumulations such as for example a dome in the portion of the base and fastening bushing. It is therefore not necessary that the thick-walled component uniformly has a corresponding thickness.

Due to the coaxial arrangement of the base bushing and the fastening bushing as well as the adjacent arrangement of the second axial end of the base bushing and the third end of the fastening bushing, it follows that, viewed from the component surface of the component, firstly, the base bushing and then the fastening bushing are arranged or inserted into the component. With respect to the process of the arranging in or inserting into the component, this means that firstly, the fastening bushing and then the base bushing are arranged in the component or inserted into the component, something that can take place in one step, too. This will be explained in detail later on with respect to the corresponding manufacturing methods.

Generally, each material can be used as the original material for the component with base bushing and fastening bushing arranged therein. Plastic materials and metals may be the original material. However, wood, wooden products or a similar material or material combinations may be used, too. For the base bushing and the fastening bushing, generally, each material can be used, with metals, plastic materials or a combination of that being preferred. With respect to the later functionality of fastening bushing, base bushing and component, it is important that the respective materials complement each other such that on the one hand, they allow a safe fastening of base bushing and fastening bushing in the component and on the other hand, a good force transmission is given in the later use. Depending on the later areas of use, the further circumstances of the respective application field must be taken into account when it comes to the choice of material, e.g. the use in an environment with a high thermal stress, aggressive chemical media or the like.

The arranging or inserting of the base bushing and the fastening bushing into the component can take place in various kinds and manners. For example, the component can include a pilot hole with our without a thread, wherein the pilot hole is stepped in correspondence with the outer diameter of the respective bushing, in order to arrange both bushings therein. In this case, both bushings additionally include a corresponding outer thread, which in case of a pilot hole without thread is self-cutting or self-tapping. Alternatively, the bushings can also be arranged in the pilot hole by means of an adhesive. The bushings may be molded or embedded into the component. Here, molding refers to a process during which the bushings were provided in the component already when manufacturing the component, e.g. by means of a primary forming process. In comparison, embedded means an approach during which the bushings have been embedded in or pressed into the component after the initial manufacturing of the component by means of a plasticizing of the component in an insertion portion. Both the molding as well as the embedding will be discussed in detail later within the frame of the different manufacturing methods. Generally, combinations of the kinds of attachment in case of one bushing or the use of different kinds of fastenings can also be realized in case of both bushings. For example, the fastening bushing can be molded while the base bushing is embedded, screwed in or glued in. In this connection, it is also important that the bushings are fastened in the material such that an axial pull-out resistance, adapted to the respective application case, of the bushings out of the material of the component is given. Due to the design of the bushings as separate elements in the first alternative of the component, a distance between both bushings, in particular between the second axial end of the base bushing and the third axial end of the fastening bushing, can be adapted individually depending on the application case and/or field. In a further embodiment, both bushings are, however, arranged directly adjacent to each other, so that there is almost no distance between the two bushings.

For the further better understanding of the component, it is described in the following by using the tolerance compensation function. The component thus constitutes the first component. In order to use the tolerance compensation function, an adjusting element with dragging element is arranged in the base bushing. The adjusting element has an outer diameter and an outer thread which match the inner diameter and inner thread of the base bushing. For example, the threads of the adjusting element and the base bushing are left-handed threads. In an initial state, the adjusting element may be completely screwed into the base bushing.

Now, a second component with an opening for a fastening screw is arranged at a distance to the first component. The fastening screw is plugged through the opening of the second component and has an outer diameter as well as an outer thread, which match the inner diameter and inner thread of the fastening bushing. This means that those two threads constitute a right-handed thread, for example. When the fastening screw now comes into contact with the dragging element of the adjusting element, the fastening screw screws the adjusting element out of the base bushing due to the friction between the dragging element and the fastening screw until the adjusting element comes into contact with the second component. After overcoming a corresponding torque, the fastening screw is further screwed into the adjusting element until it projects from the base bushing at the second axial end of the base bushing and comes into engagement with the downstream fastening bushing.

The component according to the first alternative is therefore prepared for the use with a tolerance compensation arrangement. A special advantage of this component is, that the accessibility to this component after arranging the second component to be fastened at a distance to it, does no longer have to be guaranteed. As soon as both components are aligned correctly with each other, i.e. the fastening screw can be arranged coaxially with both bushings, a fastening of both components by using the tolerance compensation function is possible. Furthermore, the component is prepared in a cost-efficient way for the use with a tolerance compensation arrangement as the bushings are directly inserted into the component.

In a second alternative, a component includes a base bushing comprising a first axial end and an opposite second axial end as well as a first inner diameter, with the base bushing being provided with a first inner thread of a first thread direction, and includes a fastening bushing comprising a third axial end and an opposite fourth axial end as well as a second inner diameter, with the fastening bushing being provided with a second inner thread of a second thread direction opposite to the first thread direction, wherein the second inner diameter is smaller than the first inner diameter and the base bushing and the fastening bushing is configured as one single piece or integrally, respectively, and arranged coaxially to one another in the component.

A difference between the component according to the first alternative and the component according to the second alternative is, that in the second alternative, the base bushing and the fastening bushing are configured as one single piece and not as separate elements. In this way, the base bushing and the fastening bushing are available as only one element in the second embodiment. This facilitates the manufacturing method as particularly when inserting the fastening bushing and the base bushing into the component, no material can enter into a gap between the two bushings.

A disadvantage of the arrangement is, however, that the use of different insertion possibilities for the base bushing and the fastening bushing is not possible. Thus, this means a limitation of variability compared with the first alternative. Furthermore, the distance between the base bushing and the fastening bushing is fixed due to the arrangement as one single piece. Compared to that, any distance between fastening bushing and base bushing can be set in the first alternative of the component, as those two bushings are present as separate components. With regard to the remaining design possibilities and advantages, reference is made to the above explanations with respect to the first alternative of the component, which analogously also apply to the second alternative of the component.

In this connection, it may be emphasized that the configuration as one single piece of base bushing and fastening bushing differs from, for example, a blind rivet nut as is described in EP 1 304 489 B1, both with respect to the used wall thicknesses as well as with respect to functionality. The blind rivet nut described therein is fastened with only a partial portion in an opening of a component, it is, however, not completely arranged therein. In order to guarantee the correct function of such a blind rivet nut, the blind rivet nut has a compressed portion or upsetting portion which forms a bead or bulge in a setting process, thus fixedly connecting the blind rivet nut with the component. In the present embodiment, the base bushing and fastening bushing that are formed as one single piece are, however, completely arranged in a component so that a compressed portion is not necessary. Therefore, other wall thicknesses compared with a blind rivet nut can also be used, which makes the design particularly advantageous.

To the extent that they are not precisely illustrated in a different way, the further embodiments described in the following apply to both the component according to the first alternative as well as according to the second alternative.

In a further embodiment of the component, the base bushing and/or the fastening bushing may have at least one, preferably completely circumferential profiling, in particular in form of a knurling or in form of rips at a radial outer side. This profiling may provide undercuts for the material of the component, so that for example in an embedding or molding of the bushings, the axial pull-out resistance of the respective bushing compared with a smooth outer wall of the respective bushing is increased. In particular, the profiling is a knurling or rips which, for example, run parallel or angularly to the axial extension of the respective bushing. With regard to a corresponding design of the outer circumference, reference is made to WO 2015/028680 A1. Corresponding combinations of the profiling are also possible. For example, a knurling can be provided in a first profiling portion, while in a second profiling portion that is axially spaced to it, a design with rips can be provided. Alternatively, the profiling can also consist of an outer thread or of sections of an outer thread. In this connection, the outer thread of the bushings can be a self-cutting thread. The respective bushing is screwable into a component opening by means of the corresponding outer thread. Furthermore, the bushings can alternatively or additionally be fastened by means of an adhesive in the component opening. Combinations of the different fastening possibilities can be realized, too.

In another embodiment of the component, the base bushing is arranged adjacent to a surface of the component with its first axial end, particularly flush with the component surface. By means of this arrangement, a precise alignment of the base bushing and thus indirectly of the fastening bushing, too, is given by means of the component surface is given. In addition, this causes a visually appealing component, with a risk of damage of the base bushing when transporting the component is minimized due to the flush arrangement of the first axial end of the base bushing. In an alternative, the first axial end of the base bushing can also be arranged in the component or can project from it, depending on the desired application case.

In a further embodiment, the third axial end of the fastening bushing is arranged adjacent to the second axial end of the base bushing and the fourth axial end of the fastening bushing advantageously includes a bottom so that the fourth axial end may be closed and an opening of the fastening bushing is only present at the third axial end. This embodiment may be advantageous in case of an embedding and/or molding-in of the base bushing into the component, as a positioning means such as a fastening arbor or assembly arbor only needs to seal the opening of the fastening bushing at the third axial end. Otherwise, the respective positioning means would also have to seal the opening at the fourth axial end in order to prevent the component material from entering from this side.

In a further embodiment, an adjusting element with a dragging element is arranged in the base bushing, the adjusting element including an outer thread matching the first inner thread of the base bushing, so that an automatic tolerance compensation of the distance to a second component can be realized. Thus, the component is provided with a further part in order to realize the later tolerance compensation function, i.e. with the adjusting element. That means that such a component minimizes the effort which a worker who processes the component has, as the adjusting element is already pre-assembled.

It may furthermore be preferred that the base bushing includes a first securing means and the adjusting element includes a second securing means, with the first and the second securing means interacting with each other, in the completely screwed-in state of the adjusting element, thus forming a transport and/or counter locking. With this embodiment, it is guaranteed that the adjusting element does not unintentionally break loose from the base bushing during transport. In addition or alternatively, an interlocking may be prevented. Thus, this guarantees the direct, undisturbed usability of the tolerance compensation function of the component. Such transport and/or counter securities or lockings are generally known in the prior art and are therefore not explained in more detail.

In a further embodiment, the adjusting element consists of metal and/or the dragging element consists at least partially of plastic material. By means of the adjusting element out of metal, a force transmission from the second component to be fastened at the first component can be realized, wherein the force transmission is improved compared with the use of plastic as the material, in particular when the base bushing also consists of metal. The dragging element out of plastic material provides for an efficient, friction connection with the fastening screw. In this case, the respective materials of dragging element and adjusting element can be adapted in an advantageous way to the respective application case. The material of the adjusting element can also correspond with the material of the base bushing and/or the fastening bushing.

A connection between a first component and a second component with a distance in-between, with the first component being an inventive component, includes a head of a fastening screw adjacent to a surface of the second component which faces away from the first component, with an outer thread of the screw engaging with the second inner thread of the fastening bushing. With respect to the advantages, reference is made to the above explanations regarding the component according to the first as well as the second alternative.

An assembly includes a base bushing comprising a first axial end and an opposite second axial end as well as a first inner diameter, with the base bushing being provided with a first inner thread of a first thread direction, includes a fastening bushing comprising a third axial end and an opposite fourth axial end as well as a second inner diameter, with the fastening bushing being provided with a second inner thread of a second thread direction that is opposite to the first thread direction, wherein the second inner diameter is smaller than the first inner diameter and includes an adjusting element comprising an outer thread which matches the inner thread of the base bushing. In a further embodiment, the assembly additionally includes a corresponding fastening screw. Thus, the assembly includes all parts for realizing the tolerance compensation function in the component after arranging or inserting, respectively, the fastening bushing and the base bushing into the component. With regard to the resulting advantages, reference is correspondingly made to the above explanations in order to avoid repetitions.

In a further embodiment, the adjusting element consists of metal and/or the dragging element consists at least partially of plastic material. As already explained above, an improved force transmission from the second component to be fastened at the first component, to the adjusting element and the base bushing can be realized by means of the adjusting element out of metal, in particular when the base bushing consists of metal, too. The dragging element out of plastic material provides for a good friction connection with the fastening screw. In this connection, the respective materials of dragging element and adjusting element can advantageously be adapted to the respective application case. The material of the adjusting element can also correspond with the material of the base bushing and/or the fastening bushing.

A setting system for manufacturing a component, in particular an inventive component, includes a first positioning means comprising a first outer diameter matching an inner diameter of a base bushing, so that the base bushing, which comprises a first inner thread of a first thread direction, can be positioned on the first positioning means, and/or a second positioning means comprising a second outer diameter matching an inner diameter of the fastening bushing, so that the second outer diameter is smaller than the first outer diameter and the fastening bushing, which comprises a second inner thread of a second thread direction, opposite to the first thread direction, can be positioned on the second positioning means, as well as a first plasticizing means which directly or indirectly provides for a plasticizing of the component before and/or during an insertion of the base bushing and/or the fastening bushing into the component, and a first moving means with which the first positioning means and/or the second positioning means can be moved, in particular along only one axis, and the base bushing and/or the fastening bushing can be inserted into the component. Thus, by means of the setting system, a component can be manufactured in which the fastening bushing and the base bushing are arranged coaxially. The manufactured component therefore may correspond with the above-described component. With respect to the advantages as well as the respective embodiments and material possibilities, reference is therefore made to the above explanations.

For reasons of clarity, the setting system is explained in the following within the frame of its use. In this connection, the first positioning means serves for receiving the base bushing and the second positioning means for receiving the fastening bushing. The respective bushings can be held in a detachable manner on the respective positioning means, so that a moving of the respective positioning means, for example by the first moving means, may be a first pneumatic cylinder, with a bushing that is fixedly arranged at it, can be guaranteed. Corresponding holding possibilities of the fastening bushing and the base bushing on the first and/or second positioning means are discussed later on with respect to a further embodiment.

Generally, when using the setting system, two different approaches are to be considered. On the one hand, the base bushing and the fastening bushing can be inserted jointly in one step into the component. In this connection, the base bushing and the fastening bushing can be present both as a single-piece element as well as separate elements. In a further embodiment, the fastening bushing and the base bushing are present separately from one another and can therefore be inserted additionally in two separate steps one after another into the component. As the fastening bushing, with respect to a later installation direction of a fastening screw, is arranged behind or downstream the base bushing, the fastening bushing is firstly inserted into the component by means of the setting system or the fastening bushing is, with respect to the insertion in one step and the resulting insertion direction, arranged before or upstream the base bushing. In a further embodiment, the setting system can also include a means for predrilling the component, which further facilitates the insertion. Alternatively, the component can already be predrilled at the respective positions.

Before inserting the respective bushing into the component, the component is firstly directly or indirectly plasticized by means of the plasticizing means. Generally, plasticizing within the meaning of the present description means that the material of the component in the insertion portion, i.e. in the portion in which the bushings are supposed to be inserted into the component, is brought into a state of plastic deformability. In this connection, direct plasticizing refers to a process during which the component is plasticized directly in the corresponding portion. This is for example carried out by heating the component in the corresponding portion. Within the frame of the indirect plasticizing, a state of the component in the insertion portion is caused via at least one of the bushings, i.e. the fastening bushing and/or the base bushing, with the state of the component allowing a plastic deformation of the component material in this portion. Among others, this can take place by heating one or both bushings or by inserting the bushings by rotating or pressing one and/or both bushings, something that also depends on the embodiment of the bushings, as is explained above. In case of the indirect plasticizing, it may be preferred that at least one of the bushings may consist of a metal.

When the component has been plasticized correspondingly in the insertion portion, the fastening bushing can be inserted into the component, in particular it can be pressed into the component. Analogously, the base bushing can be inserted into the component. Alternatively, it can also be realized that one of the two bushings be screwed into the component via an outer thread and/or that one of the bushings be glued in a component opening. Furthermore, combinations of the respective fastening possibilities can be realized. It is important, in particular in case of an insertion of the bushings as separate elements, that it is guaranteed by means of corresponding sealing means that the inner thread of the bushings is kept free of plasticized material. This function may be directly realized via the positioning means. A special case in this connection is when the fastening bushing and the base bushing are configured as one single piece or integrally, respectively, and the fastening bushing includes a bottom. In this case, it is sufficient when a positioning means is present which seals the only opening at the first axial end of the base bushing.

In a further embodiment, the first plasticizing means operates with one of the following; electric field, magnetic field, ultrasonic, oscillations, thermal radiation or a combination thereof. Depending on the used material of the component as well as the material of the base bushing and the fastening bushing, the principle to be used is chosen. The principle of heating by means of an electric or magnetic field may be preferred in case of a component and/or a bushing out of metal. The use of ultrasonic, oscillations or thermal radiation is principally possible with all materials. Depending on the desired kind of plasticizing, i.e. direct or indirect, either the component itself is brought into a plasticizing condition in the insertion portion directly with one or a combination with the corresponding operating principles. Alternatively, the component is indirectly brought into a plasticizing state in the insertion portion, by applying one of or a combination of the operating principles onto the fastening bushing and/or the base bushing. Furthermore, a combination of the direct and indirect plasticizing can be realized. For example and with respect to the application of thermal radiation, a) the component itself can be heated by means of thermal radiation (direct plasticizing), b) the fastening bushing and/or the base bushing can be heated to a temperature by means of thermal radiation which causes a plasticizing of the component in the insertion portion when the respective bushing is inserted (indirect plasticizing) or c) both approaches are combined so that both the component as well as the fastening bushing and/or base bushing are heated by means of thermal radiation. A combination of the operating principles is, for example, the heating of the component by means of thermal heating while additionally or alternatively, the fastening bushing and/or the base bushing, which consist of metal, are heated by means of an electric or magnetic field. An indirect plasticizing of the component in the insertion portion via a rotation of the fastening bushing and/or the base bushing in abutment with the component as well as under simultaneous application of pressure can be realized. An advantage of this approach is, that the kind of insertion in dependency of the used materials can be chosen in a targeted manner, so that a connection which is optimal for the respective application case can be generated between the bushings and the component, e.g. with respect to an axial pull-out resistance.

In a further embodiment, the first plasticizing means provides for a heating of the base bushing and the setting system includes a second plasticizing means which provides for a heating of the fastening bushing. The first and the second plasticizing means thus provides for an indirect plasticizing of the component. The special thing about this embodiment is, that the fastening bushing and the base bushing can be heated separately from each other. Thus, possibly existing differences between base bushing and fastening bushing can be considered better. In this case, it may be preferred when by means of the first and the second plasticizing means, a heating of the base bushing and the fastening bushing takes place by means of electromagnetic energy. In this case, the base bushing and the fastening bushing can be heated contact-free. In addition, a further plasticizing means can be provided for a direct plasticizing of the component.

In a further embodiment, the first and the second positioning means are arranged axially behind each other at a common setting head. By means of this configuration, the coaxial arrangement of the base bushing and the fastening bushing can already take place at the setting head and the insertion process into the component is facilitated in this respect as the correctly positioned alignment of the bushings to each other is already guaranteed before the insertion into the component.

In a further embodiment, based on the arrangement at a common setting head axially behind each other, the first and the second positioning means include an unchangeable position with respect to each other and are moveable jointly by means of the first moving means or the setting system includes a second moving means, may be a second pneumatic cylinder, with the first positioning means being movable by means of the first moving means and the second position means being movable by means of the second moving means, so that the first and the second positioning means are movable relatively to each other. The advantage of this construction is that in the first alternative, a distance of the base bushing and the fastening bushing is adjustable or specifiable before the insertion into the component due to the positioning means, already. In the second alternative with the positioning means that are movable relatively to one another, a distance between the fastening bushing and the base bushing can be adjusted even after inserting the fastening bushing. Therefore, the variability of the setting system is overall increased.

In a further embodiment, the first and the second positioning means are arranged next to each other at a common setting head. Due to the arrangement next to each other, the insertion of the base bushing and the fastening bushing into the component after one another is facilitated. After inserting the fastening bushing into the component, the setting head must be traversed particularly along one axis only due to this arrangement, in order to subsequently insert the base bushing in coaxial alignment with the fastening bushing into the component.

In a further embodiment, the first and the second positioning means are each arranged at a setting head. This means that two setting heads are present and that each setting head includes one of the positioning means. Each setting head may also include a corresponding plasticizing means, in particular one with which electromagnetic energy can be brought into the corresponding bushing. An advantage of this construction is that due to the use of two separate setting heads, i.e. one for the base bushing and one for the fastening bushing, the variability of the setting system is increased compared with a setting system with only one setting head for both bushings.

It may be preferred for all embodiments when the base bushing can be received on the first positioning means in a way sealed to the outside, so that in case of a later insertion, in particular an embedding, no component material can enter into the base bushing. Furthermore, it may be preferred for all embodiments when the fastening bushing can be received on the second positioning means in a way sealed to the outside, so that in case of a later insertion or embedding, no component material can enter at least via the third axial end into the fastening bushing. A corresponding sealing takes place via a correspondingly configured arbor, spike or another suitable construction which may prevent component material or adhesive from entering into the inside of the fastening bushing and/or the base bushing. In this way, it is guaranteed that the plasticized component material only flows around an outside of the respective bushing.

It may also be preferred in all embodiments when the base bushing and/or the fastening bushing are held on the first and/or second positioning means by means of: friction connection, in particular by means of a spring, depression or negative pressure, adhesive, magnets or a suitable outer thread of the first and/or the second positioning means or a combination thereof. By means of this approach, a safe and detachable holding of the respective bushing on the respective positioning means is realized until the respective bushing is inserted into the component in the desired final position.

In a further embodiment, the setting system includes a first detecting means for detecting an equipment of the first and/or the second positioning means with the base bushing and/or the fastening bushing. The first detecting means is for example a means for retrieving the dynamic pressure, an optical detecting means, in particular with a camera system, a difference light switch or a light band sensor. With the help of the first detecting means, it can thus be checked whether the fastening bushing and/or the base bushing are already arranged on the respective positioning means. It may furthermore be preferred that the setting system comprises a second detecting means for detecting a setting depth of the base bushing and/or fastening bushing into the component. The second detecting means is for example a means for detecting the dynamic pressure or a position measuring system. The insertion of the respective bushing into the desired insertion depth is thereby guaranteed. In this connection, the setting system may include both the first as well as the second detecting means.

A first alternative of a manufacturing method for a component, in particular an inventive component, includes the steps: providing the component as well as a base bushing and a fastening bushing, or providing the component with fastening bushing molded therein and a separate base bushing, inserting the fastening bushing and/or the base bushing into the component so that the fastening bushing and the base bushing are arranged coaxially to one another in the component. By means of the manufacturing method, the fastening bushing and/or the base bushing are inserted into the component with or without pilot hole. This manufacturing method may be applied when a component with an already molded-in fastening bushing is provided. In this case, only the base bushing is inserted into the component in the second step. The base bushing can be inserted into the component with or without adjusting element arranged therein. With regard to the possibilities for inserting the fastening bushing and/or the base bushing as well as to the corresponding advantages of such a component, reference is made to the above embodiments regarding the component.

In a further embodiment, the manufacturing method comprises the following step before inserting the fastening bushing and/or the base bushing: direct or indirect plasticizing of the component in an insertion portion until the material is plasticized at the place intended for an insertion of the base bushing and/or the fastening bushing. In this way, an embedding of the fastening bushing and/or the base bushing into the component may be realized. As already explained above, the embedding refers to an approach during which the respective bushing is pressed into the component material which is plasticized in the insertion portion. This may be a plastic component. In order to minimize or avoid the formation of a bead in the insertion portion due to suppressed component material, the component may be provided with a bore hole before the plasticizing, i.e. it is pre-bored. In addition or alternatively, a corresponding bead can be removed after inserting by post-processing the component.

It may furthermore be preferred that the insertion of the fastening bushing and the base bushing takes place in a joint step. Due to this approach, a sealing of the inner space of the corresponding bushing when using suitable positioning means is, as described above, securely guaranteed. Furthermore, due to the correctly positioned arrangement of the bushings already before the insertion, the method is facilitated.

In a further embodiment, the insertion of the fastening bushing and the base bushing takes place one after another in two separate steps. By that, different kinds of insertion for the corresponding bushings can be used. For example, the fastening bushing can be embedded while the base bushing is screwed in. When using the same kind of insertion, it can take place specifically one after the other and be adapted to the respective material combination of component and fastening bushing or base bushing.

In a further embodiment, a setting system is therefore used for at least one part of the steps. With respect to the advantages, reference is made to the above explanations regarding the setting system.

A second alternative of a manufacturing method for a component, in particular for an inventive component, includes the steps: providing a mold for the component as well as a base bushing and a fastening bushing, with the base bushing comprising a first inner diameter and a first inner tread of a first thread direction and the fastening bushing comprising a second inner diameter that is smaller than the first inner diameter, as well as a second inner thread of a second thread direction opposite to the first thread direction, coaxially arranging the base bushing and the fastening bushing in the mold on a core, which may be a common core, inserting the component material into the mold and demolding the molded component with base bushing and fastening bushing molded therein. With this manufacturing method, the base bushing and the fastening bushing can be molded into the material directly when manufacturing the component itself. Thus, molding-in refers to an approach during which the bushings, within the frame of a primary forming process, are arranged and fastened in the component for manufacturing the component. Primary forming processes include, for example, casting, pressure casting, spray compacting, injection molding, extrusion blow molding, extrusion, sintering, electroforming and rapid prototyping. This method is therefore a particularly effective approach for manufacturing a component with a preparation for using a tolerance compensation function. With respect to the arising advantages, reference is therefore again made to the component.

A fastening method for two components to one another comprises the steps: providing a first component, with the first component being an inventive component, and arranging an adjusting element in the base bushing or providing a first component with adjusting element, subsequently providing a second component at a distance to the first component and inserting a fastening screw through an opening in the second component into the adjusting element, with the fastening screw including an outer thread and an outer diameter matching the second inner thread and second inner diameter of the fastening bushing, rotating the fastening screw which causes the adjusting element to be screwed out of the base bushing until it comes into abutment with the second component, and subsequently, further rotating the fastening screw so that the fastening screw comes into engagement with the fastening bushing and the two components are fixed to one another at a distance. By means of the fastening method, an easy connection between two components with a tolerance compensation in the distance between the components can be realized. With respect to the advantages, reference is made to the above explanations regarding the component as well as the corresponding connection.

4. BRIEF DESCRIPTION OF THE ACCOMPANYING DRAWINGS

Figure 2:
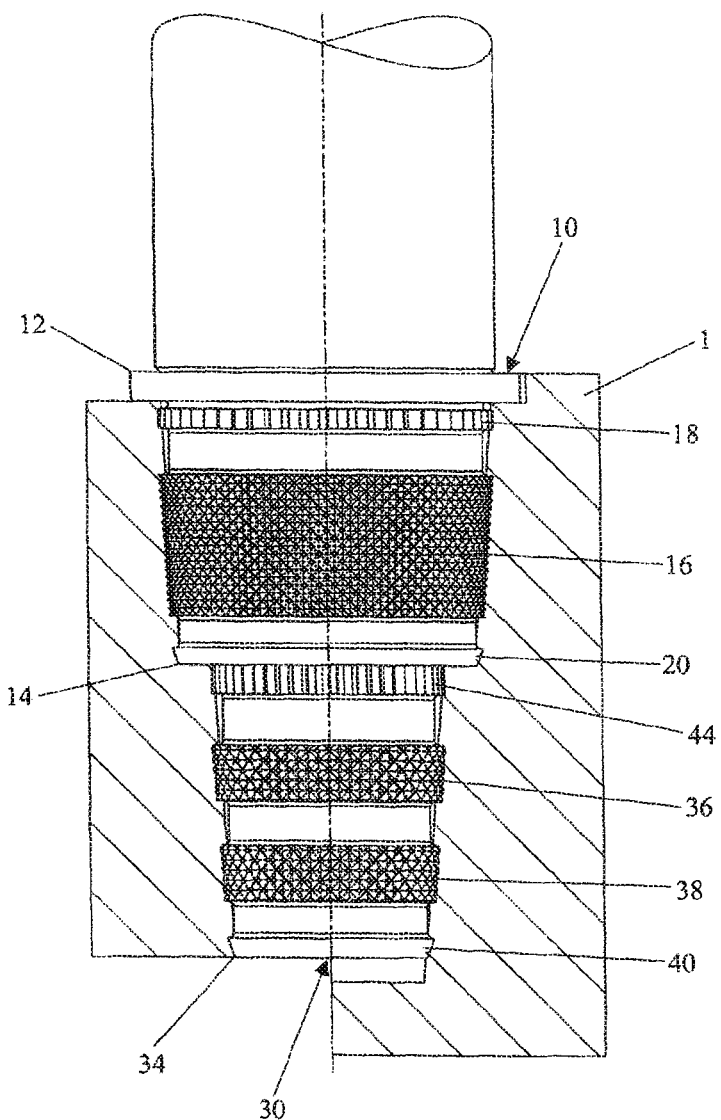
Figure 3:
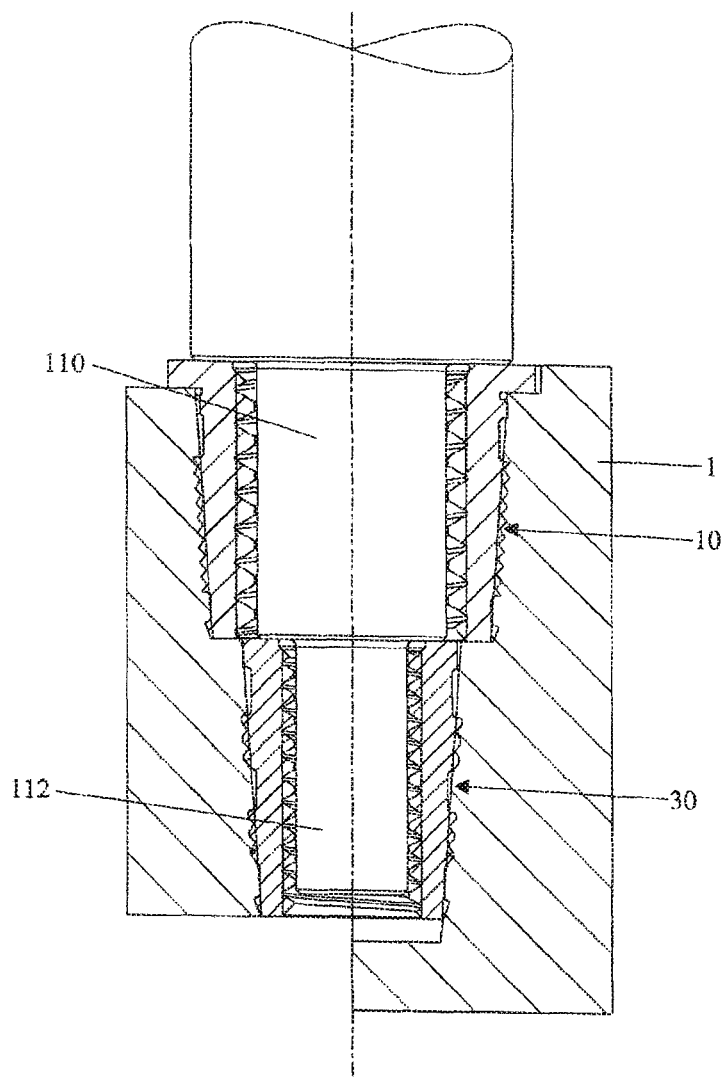
Figure 4:
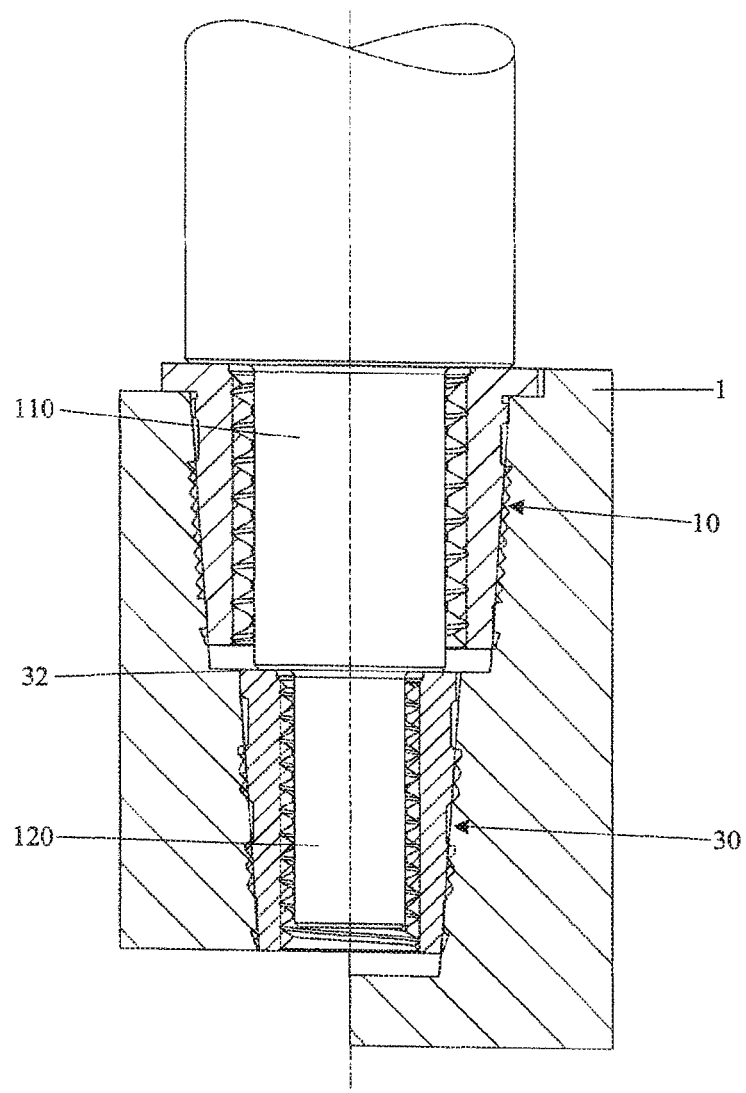
Figure 5:
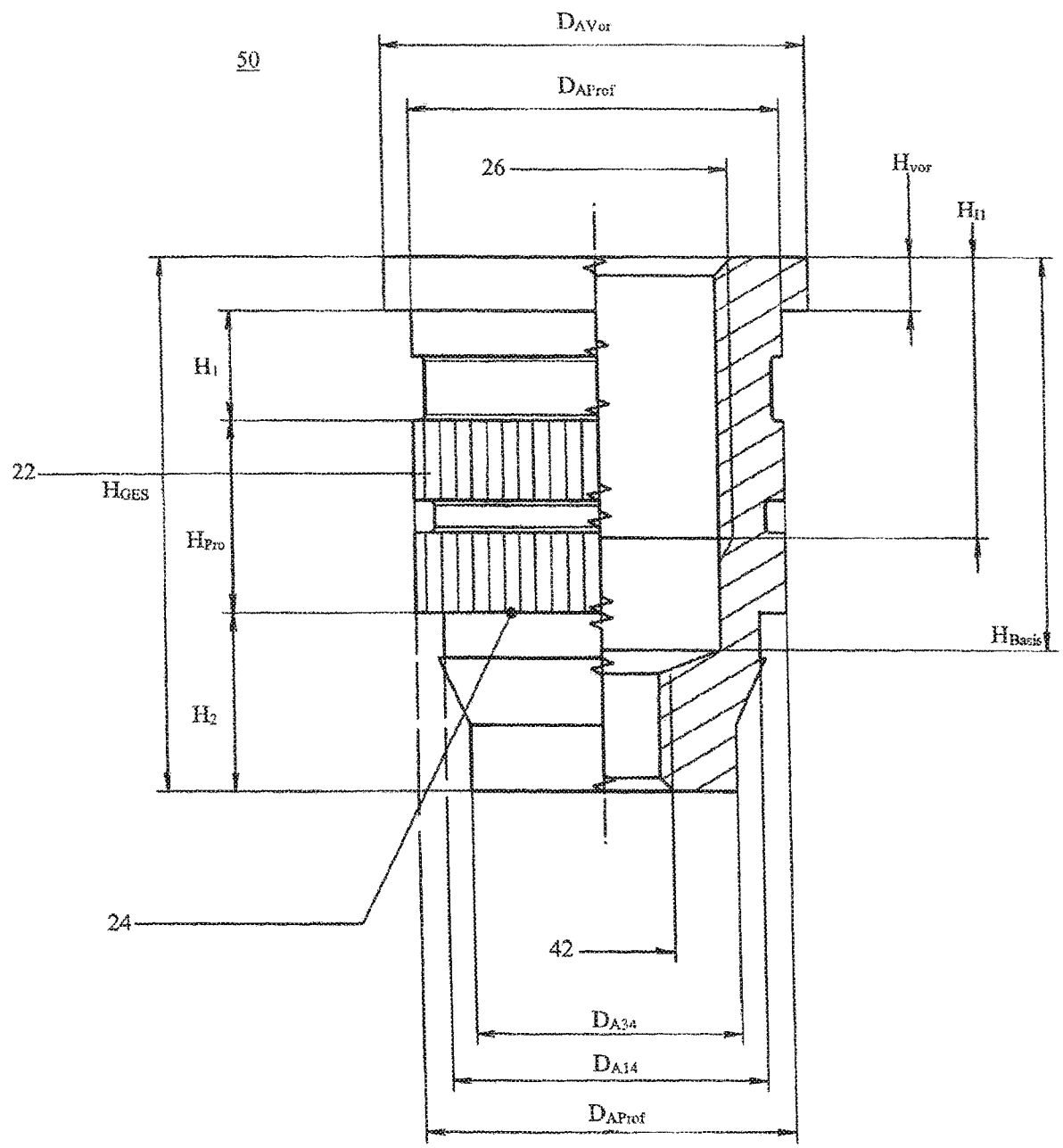
Figure 6:
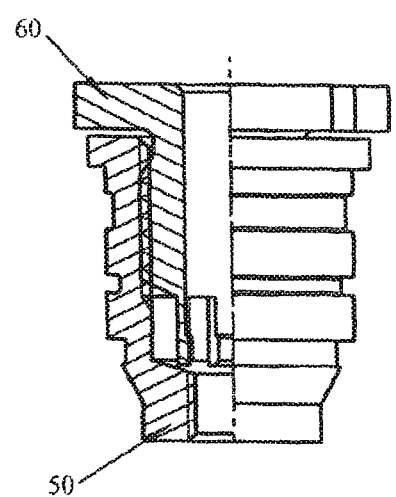
Figure 7:
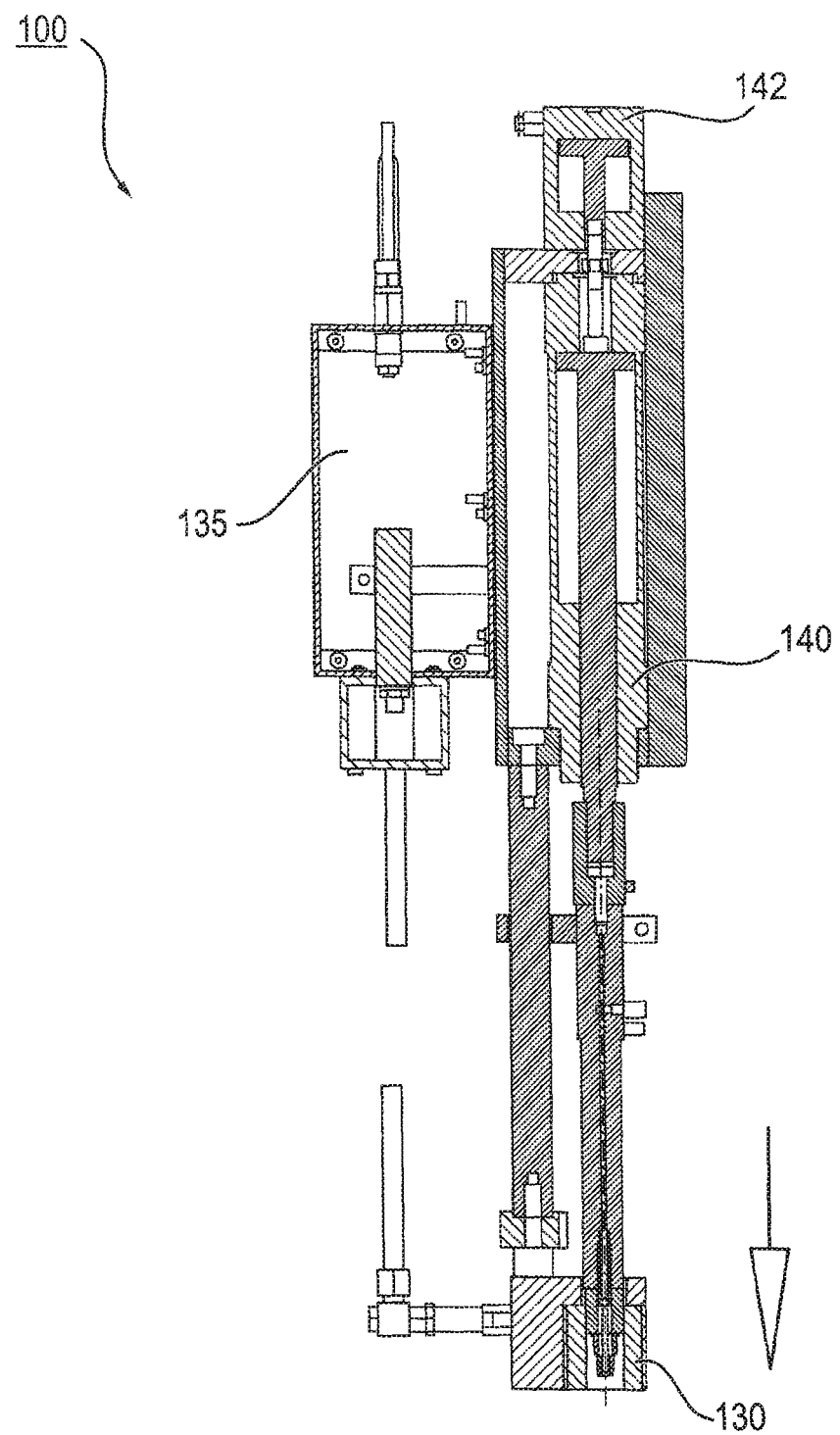
Figure 8:
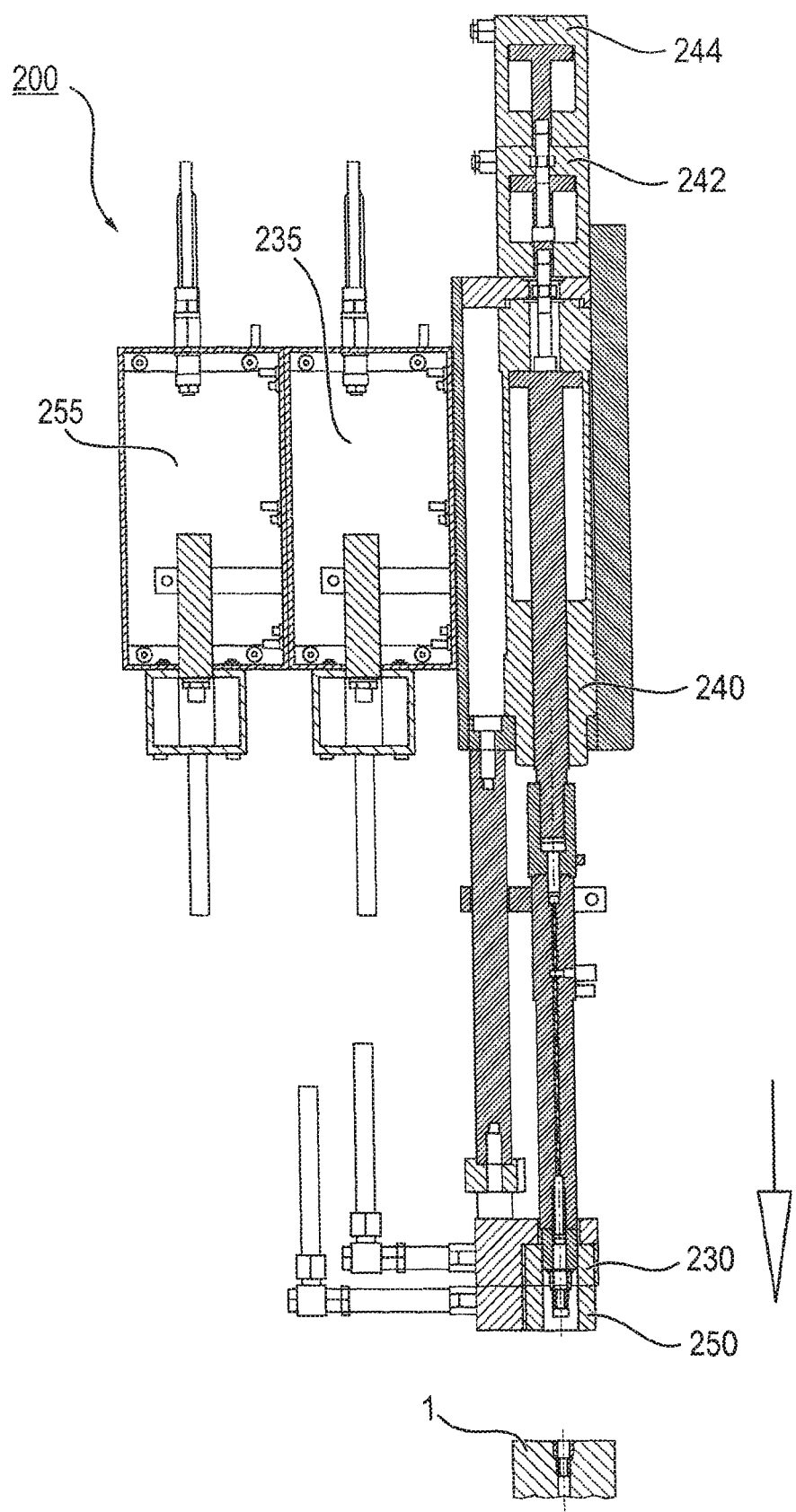
Figure 9:
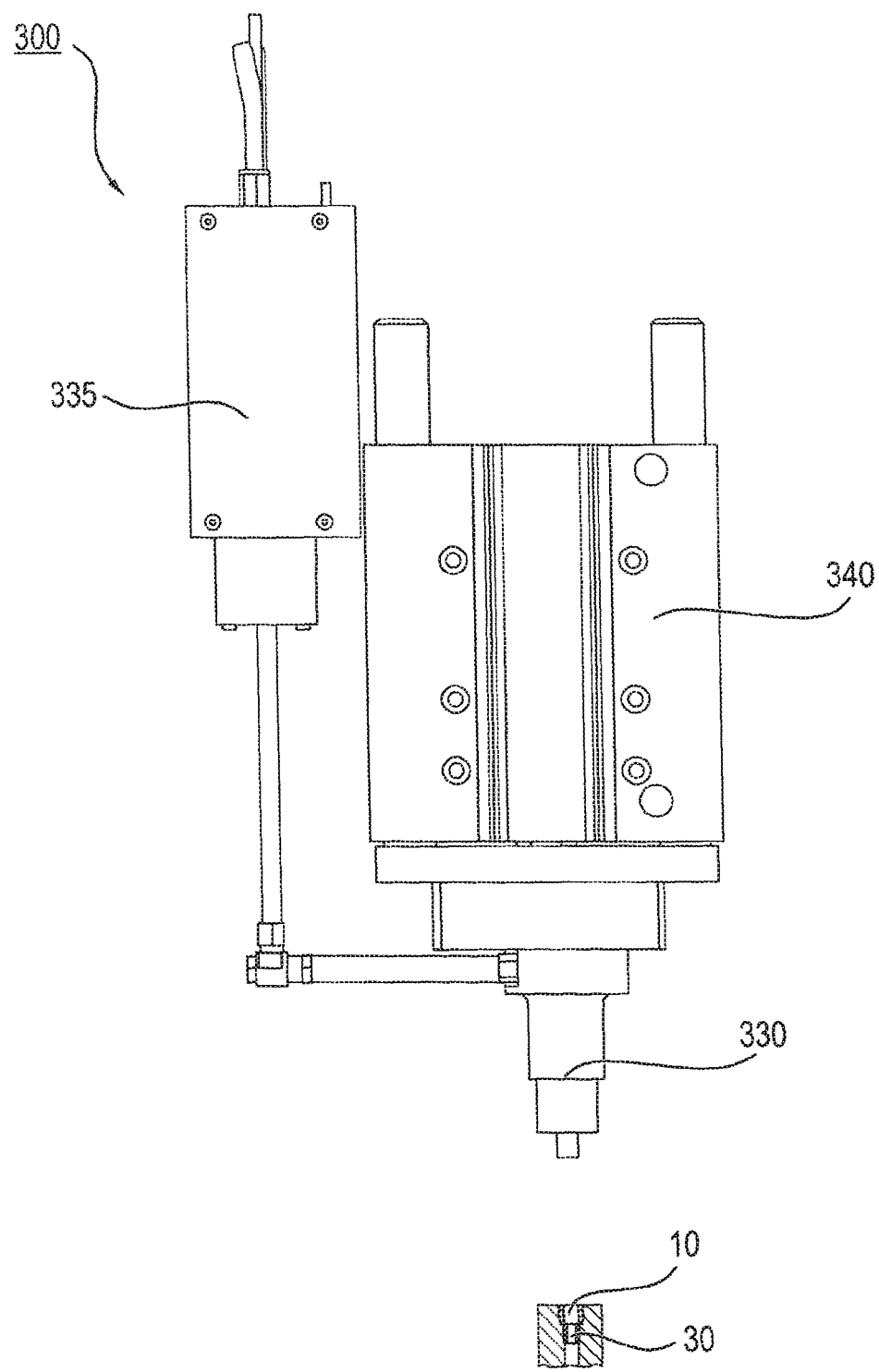
Figure 10:
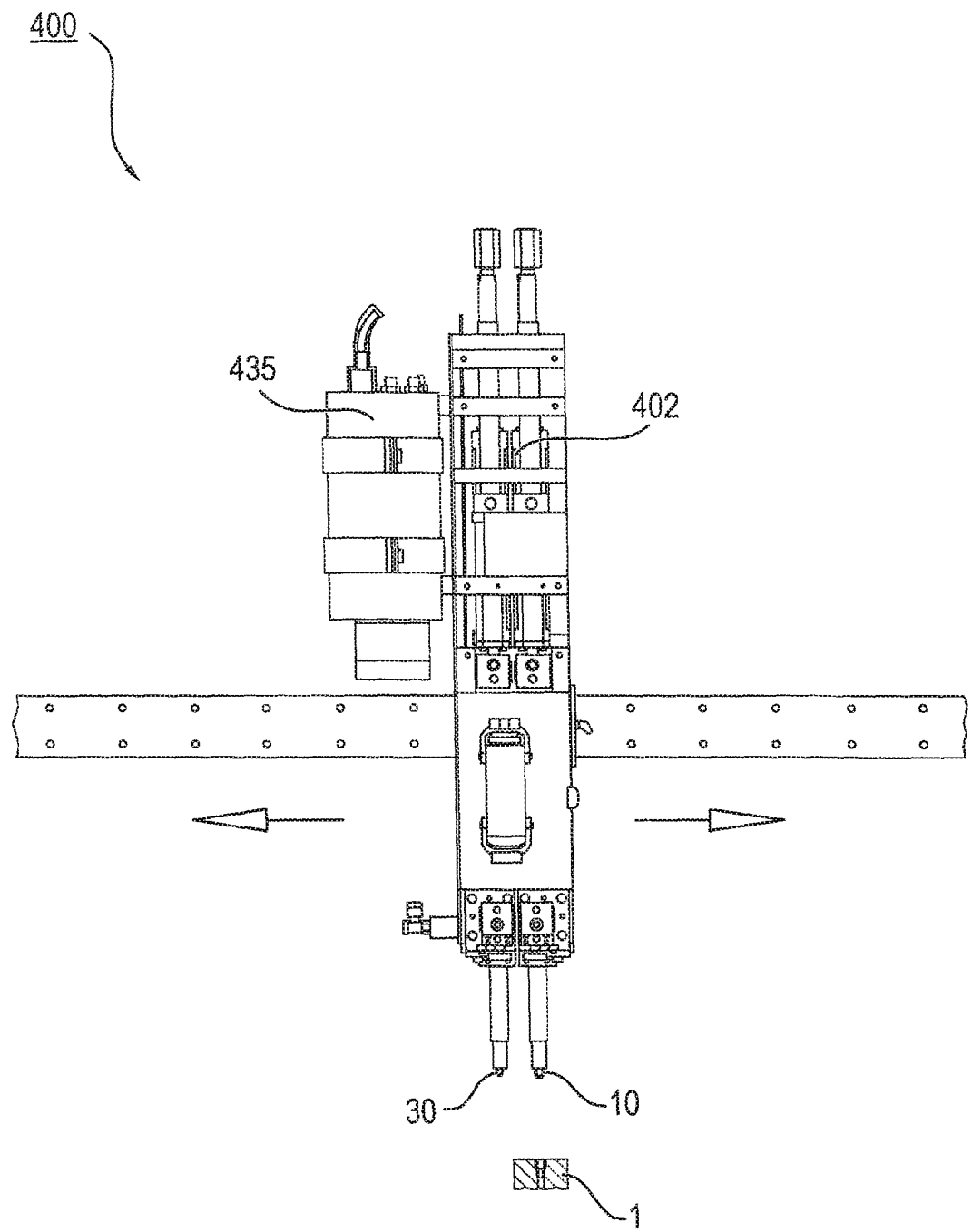
Figure 11:
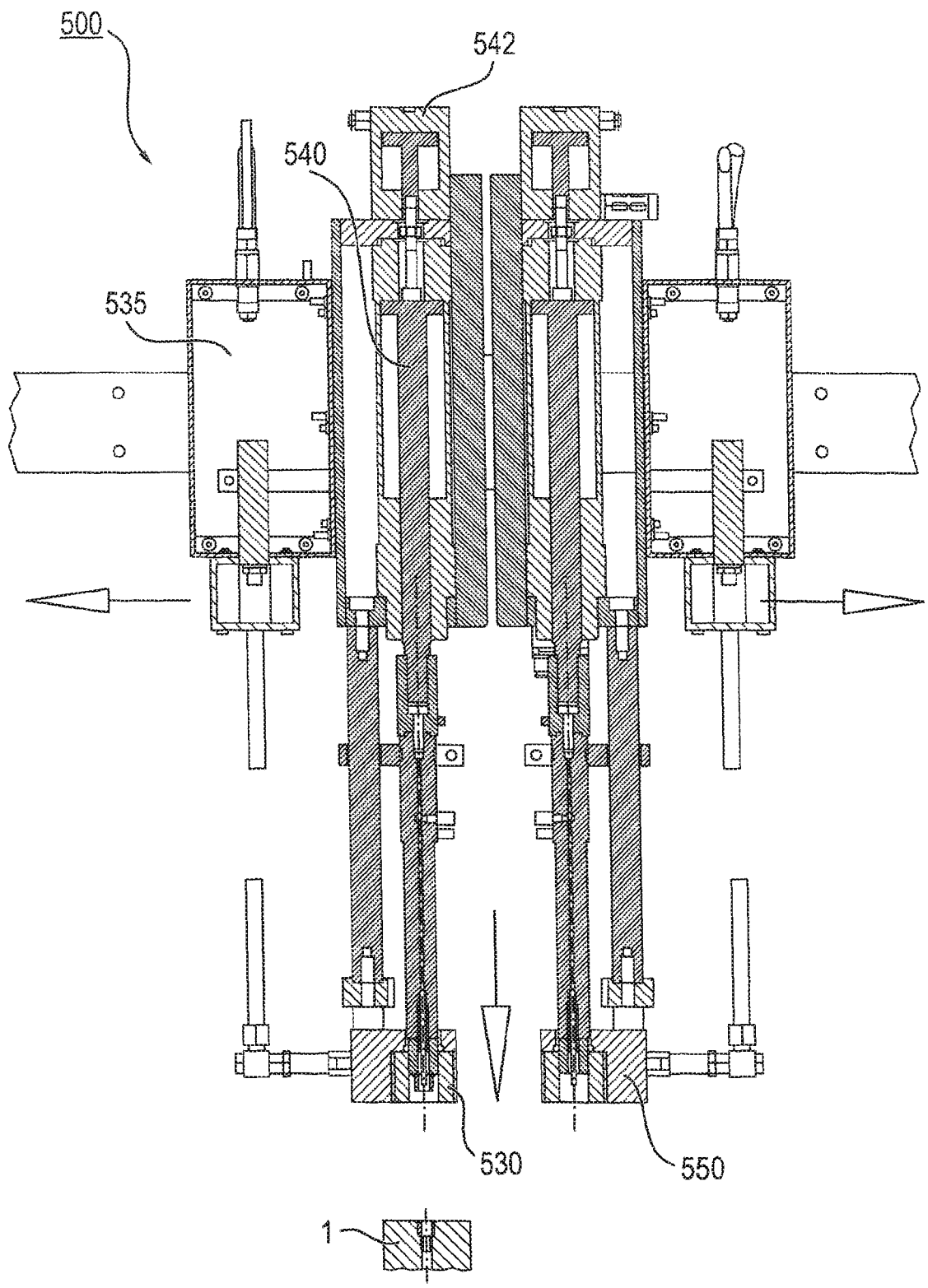
Figure 12:
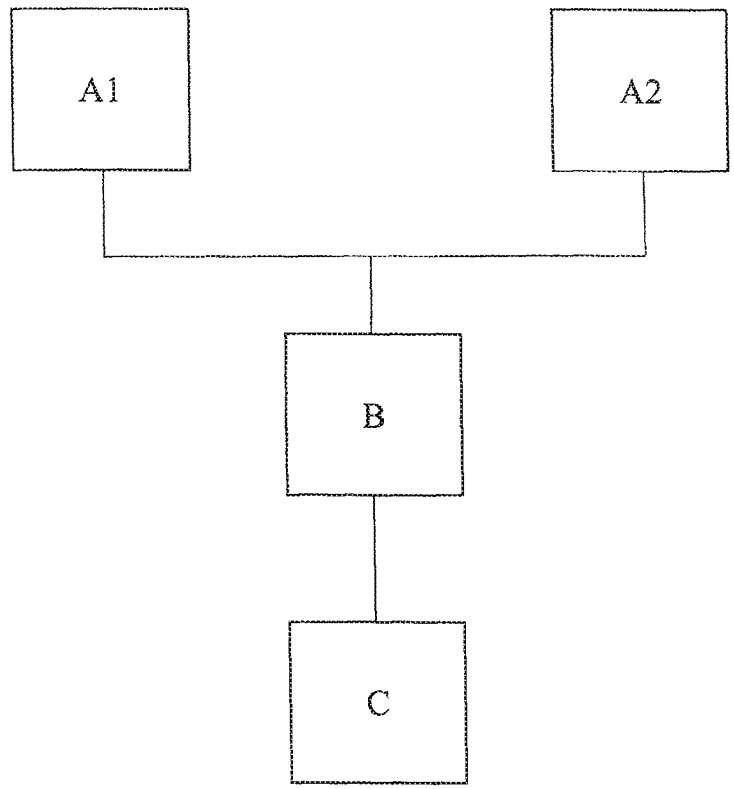
Figure 13:
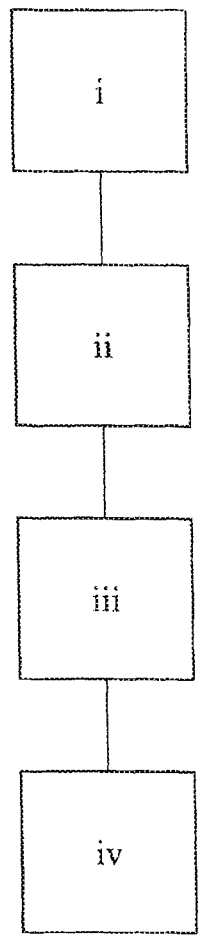
Figure 14:
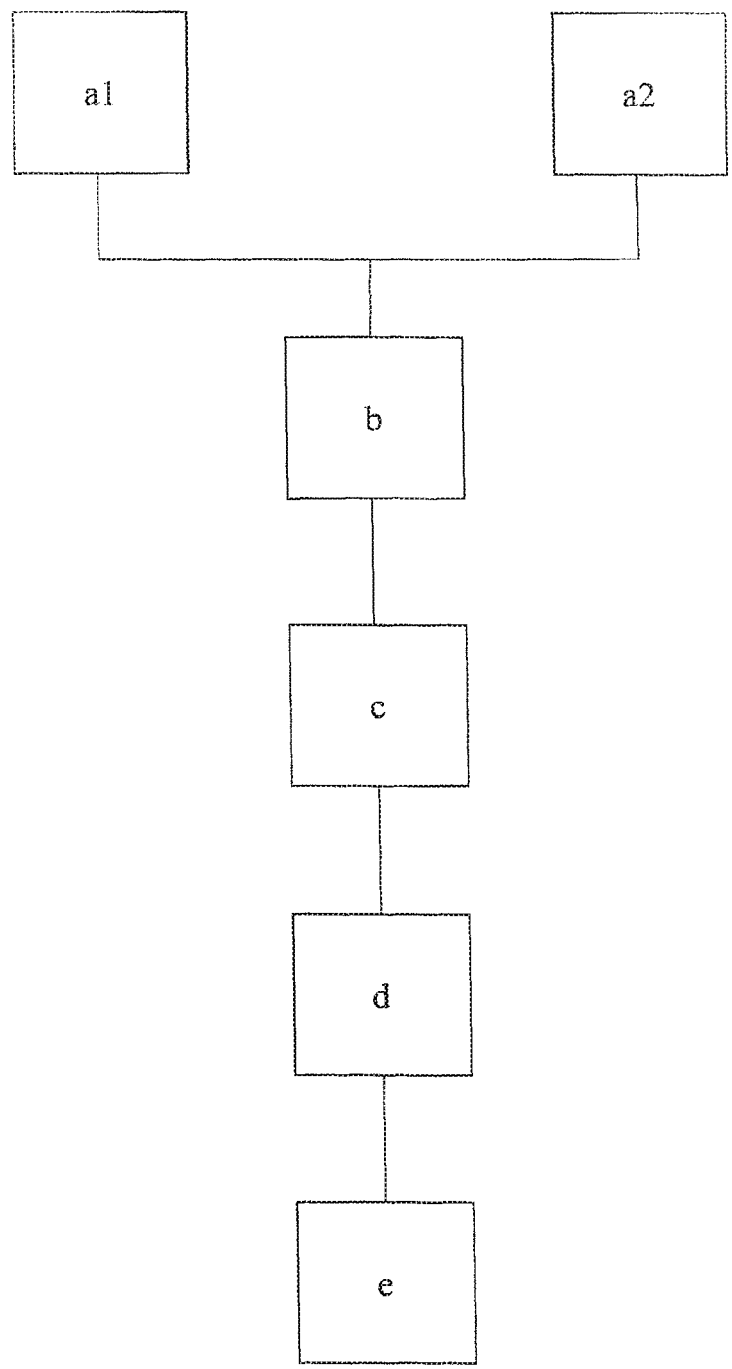
Figure 15:
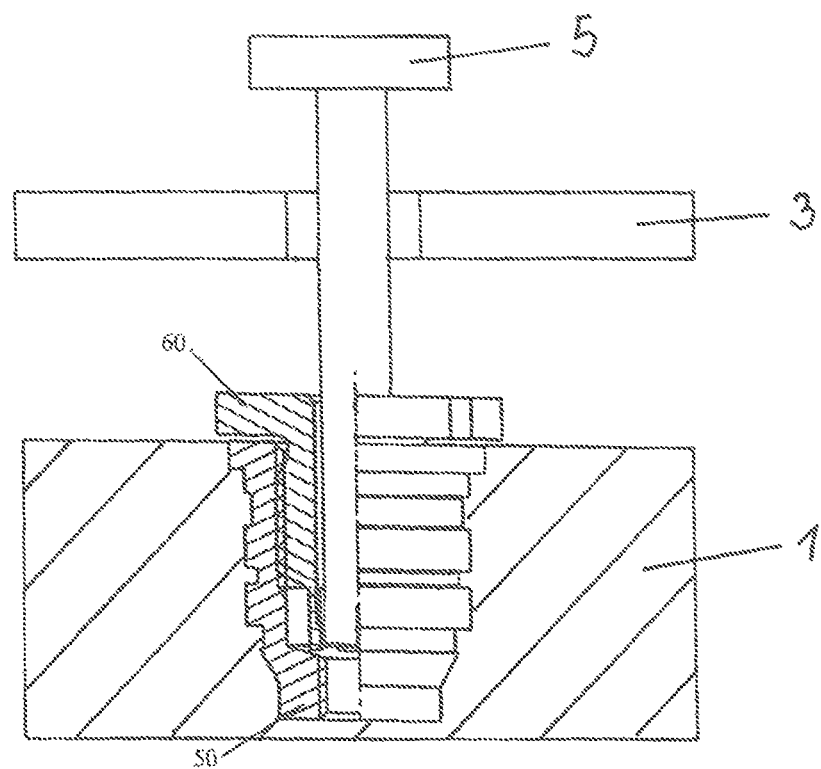
Figure 16:
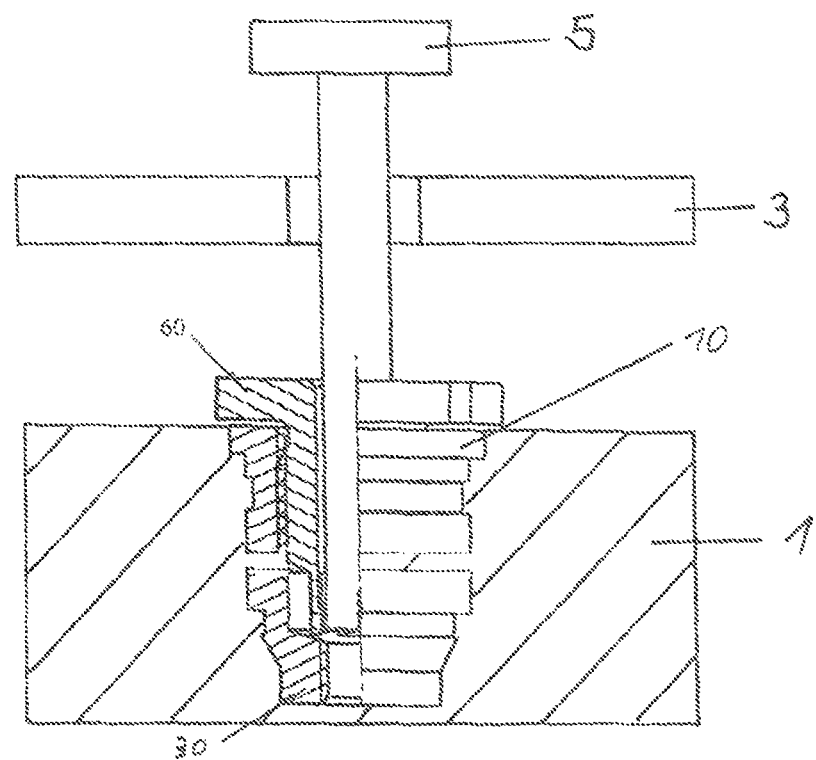

In the following, the present disclosure will be described in detail based on the drawings. In the drawings, the same reference signs denote the same components and/or elements. It shows:

FIG. 1 a side view with partial sectional view of a base bushing and a fastening bushing for use in a component according to an embodiment, FIG. 2 a side view of a base bushing and a fastening bushing for use in a component according to FIG. 1, FIG. 3 a sectional view through a base bushing and a fastening bushing for use in a component according to FIG. 1, FIG. 4 a sectional view through a base bushing and a fastening bushing for use in a component according to a further embodiment, FIG. 5 a side view, partially sectional, of a base bushing and fastening bushing configured as one single piece for use in a component according to an embodiment, FIG. 6 a side view, partially sectional, of the base bushing and fastening bushing configured as one single piece of FIG. 5 with adjusting element arranged therein, FIG. 7 a sectional view of a first embodiment of a setting system as well as the resulting product, FIG. 8 a sectional view of a second embodiment of a setting system as well as the resulting product, FIG. 9 a sectional view of a third embodiment of a setting system as well as the resulting product, FIG. 10 a sectional view of a fourth embodiment of a setting system as well as the resulting product, FIG. 11 a sectional view of a fifth embodiment of a setting system as well as the resulting product, FIG. 12 a schematic course of procedure of a first embodiment of a manufacturing method, FIG. 13 a schematic course of procedure of a second embodiment of a manufacturing method, FIG. 14 a schematic course of procedure of an embodiment of a fastening method, FIG. 15 a side view, partially sectional, of a connection of a first component and a second component with the first component having the base bushing and fastening bushing configured as one single piece and with adjusting element arranged therein, and FIG. 16 a side view, partially sectional, of a connection of a first component and a second component with the first component having the base bushing and fastening bushing configured as separate elements and with adjusting element arranged therein.

5. DETAILED DESCRIPTION

FIGS. 1 to 4 show a base bushing 10 and a fastening bushing 30 out of metal which are coaxially arranged or inserted, respectively, in a component. Generally, other materials than metal can also be used for the base bushing 10 and the fastening bushing 30, for example plastic materials. In this connection, the base bushing 10 and the fastening bushing 30 are illustrated in FIGS. 1 to 4 as separate elements. The base bushing 10 has a first axial end 12 and an opposite second axial end 14. Furthermore, the fastening bushing 30 includes a third axial end 32 as well as an opposite fourth axial end 34.

In the embodiment according to FIGS. 1 to 4, the base bushing 10 includes a conical outer form as well as a radially protruding portion at a radial outer side having a completely circumferential first profiling 16 in form of a knurling. This first profiling 16 is arranged centrally with respect to an axial extension or height of the base bushing 10. A radial projection with a second profiling 18 is provided adjacent to the first axial end 12 and a radial projection 20 with a smooth outside is provided adjacent to the second axial end 14. The second profiling 18 consists of rips which are arranged in the direction of the axial extension of the base bushing 10. The first profiling 16 is axially spaced from the second profiling 18 and the radial projection 20 via interposed smooth sections which do not project radially, so that they form an undercut with the projecting portions. Furthermore, a flange is provided at the first axial end 12.

The fastening bushing 30 is constructed analogously to the base bushing 10 and also has a conical outer shape. Furthermore, the fastening bushing 30 comprises two radially projecting portions, each having a profiling, i.e. a third 36 as well as a fourth profiling 38.

The third profiling 36 is arranged at a distance from a third axial end 32, the fourth profiling 38 is arranged at a distance from a fourth axial end 34 and both profilings 36 and 38 are arranged with a distance to each other. Alternatively, it may be preferred that the fastening bushing 30 has a profiling central with respect to an axial extension or height of the fastening bushing 30, analogous to the base bushing 10. Adjacent to the third axial end 32, a radially projecting portion with a fifth profiling 44 and adjacent to the fourth axial end 34, a radial projection 40 with a smooth outer side is provided. The fifth profiling 44 consists of rips which are arranged in the direction of the axial extension of the fastening bushing 30. The third profiling 36 is axially spaced from the fifth profiling 44 via an interposed section. Furthermore, the fourth profiling 38 is also axially spaced from the radial projection 40 via an interposed smooth section. The smooth sections do not project radially so that they also form an undercut with the projecting portions.

In an alternative embodiment that is not illustrated, only the base bushing 10 has another design, while the outer design of the fastening bushing 30 corresponds with the design shown in FIG. 1 and is therefore not discussed. The base bushing has a cylindrical outer shape as well as two radially projecting portions, each with a profiling, i.e. a sixth as well as seventh profiling. The sixth profiling is arranged at a distance from the first axial end, the seventh profiling is arranged at a distance from the second axial end and both profilings are arranged at a distance to one another. Both the sixth as well as the seventh profiling include rips as the profiling means, with the rips of the sixth profiling running with a left inclination with respect to the axial extension of the base bushing and the rips of the seventh profiling running with a right inclination with respect to the axial extension of the base bushing. The rips of the two profilings are thus inclined in opposite directions, which may be the same angle amount. The portions without profiling do not project radially and are smooth, so that again, they form an undercut with the projecting portions.

FIG. 3 shows a cut through the base bushing 10 and the fastening bushing 30 corresponding to FIGS. 1 and 2 which are inserted into a component 1. Additionally, an exemplary construction of a positioning means can be recognized, as is discussed in detail later in connection with the embodiment of the setting system according to FIG. 7. The base bushing 10 includes a first inner diameter as well as a first inner thread 26 of a first thread direction. In this connection, the first inner thread 26 is a left-handed thread.

The fastening bushing 30 includes a second inner diameter which is smaller than the first inner diameter of the base bushing 10. This is well-founded in the function of the fastening bushing 30 for fastening a fastening screw 5 and the base bushing 10 for receiving an adjusting element with dragging element. The fastening bushing 30 is provided with a second inner thread 42 of a second thread direction, which is opposite to the first thread direction. Thus, the inner thread of the fastening bushing 30 is a right-handed thread.

The base bushing 10 is furthermore arranged flush with its first axial end 12 with the component surface of the component 1. The third axial end 32 of the fastening bushing 30 is arranged adjacent to the second axial end 14 of the base bushing 10. In the embodiment illustrated in FIGS. 1 to 3, the third axial end 32 of the fastening bushing 30 is adjacent to the second axial end 14 of the base bushing 10. In a further embodiment according to FIG. 4, a distance between the third axial end 32 of the fastening bushing 30 and the second axial end 14 of the base bushing 10 may be provided. In the illustrated embodiments, the fastening bushing 30 is configured open at the fourth axial end 34. In a further embodiment, the fastening bushing 30 can comprise a bottom at the fourth axial end 34, so that the fourth axial end 34 is closed and an opening of the fastening bushing 30 is only present at the third axial end 32. In this case, only the opening at the third axial end 32 must be sealed against component material in case of an embedding or molding-in, which is described later in the description of the embodiments of the setting system.

Now, with reference to FIG. 5, a further embodiment of base bushing 10 and fastening bushing 30 is shown. In this embodiment, the base bushing 10 and the fastening bushing 30 are configured as a single-piece element 50. The base bushing 10 and fastening bushing 30, which are formed as one single piece, have a total height $H_{Ges}$. The proportion of the base bushing 10 regarding the total height $H_{Ges}$ is $H_{Basis}$. A radial projection adjacent to the first axial end of the base bushing 10 has a height of $H_{Vor}$. In a first distance $H_1$ of that, the portion with the sixth 22 and seventh profiling 24 is arranged, which takes up a height $H_{Pro}$. In contrast to the above-described, not illustrated embodiment, the rips of the sixth 22 and seventh profiling are arranged along the axial extension of the base bushing 10. A distance from the fourth axial end of the fastening bushing 30 to the portion with the profilings is referred to as $H_2$.

In the inside, the inner diameter of the base bushing 10 merges into the inner diameter of the fastening bushing 30 over a conically running step. In the inside, the base bushing 10 includes the inner thread 26 of the first thread direction and the fastening bushing 30 has the inner thread 42 of the opposite second thread direction. The inner thread of the first thread direction extends over a height $H_{I1}$ in the base bushing 10.

The fastening bushing 30 has an axial diameter $D_{A34}$ at the fourth axial end 34. The outer diameter merges into the outer diameter $D_{A14}$ at the second axial end 14 of the base bushing 10 over a conically running step, which forms an undercut. In the portion of the profilings, the base bushing 10 has an outer diameter $D_{AProf}$ which, in the illustrated example, is only present in the portions with profiling, but not over the total height of the profilings Hero. Due to the radial projection, the base bushing has an outer diameter $D_{AVor}$ adjacent to the first axial end 12, which is bigger than the outer diameter $D_{AProf}$ in the portion of the profilings. By means of the design that is present due to the different outer diameters as well as the arrangement of the profilings in the middle portion of the single-piece element out of base bushing 10 and fastening bushing 30, a high pull-out resistance of the element in case of an embedding or molding into the component can be realized.

The configuration illustrated here as one single piece out of base bushing 10 and fastening bushing 30 differs, for example, from a blind rivet nut as is described in EP 1 304 489 B1, both with respect to the used wall thicknesses as well as in the generally different functionality. The blind rivet nut described therein is fastened with only a partial portion in an opening of a component, it is, however, not completely arranged therein. In order to guarantee the correct function of such a blind rived nut, the blind rive nut must have a compression portion which forms a bead in a setting process, thereby fixedly connecting the blind rivet nut with the component. In the present embodiment, the base bushing 10 and the fastening bushing 30 which are configured as one single piece, are, however, completely arranged in a component, so that a compressed portion is not necessary. Therefore, other wall thicknesses can also be used compared with a blind rivet nut, something that is particularly advantageous with respect to the achievable strengths, in particular the tensile strength.

FIG. 6 shows the single-piece element 50 consisting of base bushing 10 and fastening bushing 30 according to FIG. 5 with adjusting element 60 with dragging unit inserted therein. The adjusting element 60 includes an outer thread which matches the first inner thread 26 of the base bushing 10, so that an automatic tolerance compensation of the distance to a second component 3 can be realized. The base bushing 10 may include a first securing means and the adjusting element 60 a second securing means. Particularly in the completely screwed-in state of the adjusting element 60 do the securing means interact such that a transport and/or counter locking is formed. Such transport and counter securities are generally known. As the material, metal is used for the adjusting element, with the dragging element at least partially consisting of plastic material. An improved force transmission from the second component 3 to be fastened at the first component can be realized by means of the adjusting element 60 out of metal, compared with when using plastic as the material, in particular when the base bushing 10 consists of metal, too. The dragging element out of plastic provides for an efficient friction connection with the fastening screw 5. In this connection, the respective materials of dragging element and adjusting element 60 can be adapted to the respective application case. The material of the adjusting element 60 can also correspond with the material of the base bushing 10 and/or the fastening bushing 30.

Alternatively to the above-discussed profilings, another shape can be provided at the outer side of the base bushing 10 and/or the fastening bushing, which enables a secure fastening of the bushings 10 and 30 in the component. For example, this can be an outer thread for screwing in the component or a structure which advantageously supports a connection to the component via an adhesive.

Now, with reference to FIGS. 7 to 11, different embodiments of a setting system according to the present disclosure are described. In a first embodiment, the setting system 100 comprises a first positioning means 110 and a second positioning means 120. With respect to the positioning means 110 and 120, reference is made to FIGS. 3 and 4.

The first positioning means 110 includes a first outer diameter which matches an inner diameter of the base bushing 10. Thus, the base bushing 10 can be positioned on the first positioning means 110, in particular in a way sealed against the entry of plasticized component material, which is explained later.

The second positioning means 120 has a second outer diameter which matches the inner diameter of the fastening bushing 30. The second outer diameter is therefore smaller than the first outer diameter. Accordingly, the fastening bushing 30 can be positioned on the second positioning means 120, in particular in a way sealed against the entry of plasticized component material, which is also explained later.

The bushings 10 and 30 can be held on the first 110 and the second positioning means 120 by means of friction connection, in particular by means of a spring, depression or negative pressure, adhesive, magnets or a suitable outer thread of the first 110 and/or the second positioning means 120 or a combination thereof. By means of this approach, a safe and detachable holding of the respective bushing 10, 30 on the respective positioning means 110, 120 is realized, until the respective bushing 10, 30 has been inserted in the desired final position into the component 1. The positioning means 110 and 120 can comprise metal or ceramic as the material.

Furthermore, the setting system 100 includes a first plasticizing means 130. In the illustrated example, the plasticizing means 130 is a so-called tube converter or transducer. The tube transducer is operated via a generator 135 and comprises a tube-shaped hollow space, in which the base bushing 10 and the fastening bushing 30 can be arranged. Optionally, a compensator can be provided which is interposed between the first plasticizing means 130 and the generator 135 in order to adapt the plasticizing means 130 to the generator 135. When the base bushing 10 and the fastening bushing 30 are arranged in the hollow space of the tube transducer, the bushings 10, 30 out of metal can be heated contact-free by means of a concentrated electromagnetic alternating field, which generates eddy currents in the bushings 10, 30. In this connection, the bushings 10, 30 are simultaneously and evenly heated to a temperature which, when contacting the component, leads to a plasticizing of the component material in the insertion portion of the bushings 10, 30. This approach is called indirect plasticizing within the frame of the present description, as the component is not directly plasticized, but the plasticizing takes place via a further component, namely the bushings 10 and 30. Due to the simultaneous and even heating of both bushings 10 and 30 by means of a tube transducer, the tube transducer must be adapted to a fixed size of the corresponding bushings 10 and 30.

Finally, the setting system 100 has a first moving means, with which the first positioning means 110 and the second positioning means 120 can be moved along a common axis. In the illustrated example, the first moving means comprises two pneumatic cylinders 140 and 142, with which besides a setting stroke, an equipping stroke can be executed, too. In this way, the base bushing 10 and the fastening bushing 30 can be inserted into the component, in particular be embedded.

Optionally, the setting system 110 comprises a first detecting means for detecting an equipment of the first 110 and/or second positioning means 120 with the base bushing 10 and/or the fastening bushing 30. The first detecting means is, for example, a means for retrieving the dynamic pressure, an optical detecting means, in particular with a camera system, a difference light switch or a light band sensor. By means of the first detecting means, it can therefore be checked whether the fastening bushing 30 and/or the base bushing 10 are already arranged on the respective positioning means 110, 120. Alternatively or additionally, a second detecting means for detecting a setting depth of the base bushing 10 and/or fastening bushing 30 into the component 1 can be provided. The second detecting means is, for example, a means for detecting the dynamic pressure or a distance measuring system. By that, the insertion of the respective bushing 10, 30 into the desired insertion depth is guaranteed. By means of this detecting means, a precise control of the setting process as well as the check of the equipping of the setting system 100 may be realized.

When using the setting system 100, first of all, an equipping of the first positioning means 110 with the base bushing 10 in an equipping position takes place. Subsequently, the second positioning means 120 is equipped with the fastening bushing 30. In case of the single-piece element 40, this equipping takes place at the same time. Now, the positioning means 110, 120 are moved out from the equipping position to a heating position and heated by means of the first plasticizing means 130. After a sufficient heating, the bushings 10, 30 are now inserted in the component 1 which is arranged below by means of a setting stroke of the first moving means. The bushings 10, 30 are held in the desired insertion depth and cool down. After the cooling down, the moving means drives the positioning means 110 and 120 back into a base position or an equipping position.

Now, with reference to FIG. 8, a second embodiment of a setting system 200 is illustrated. Just as the setting system 100, the setting system 200 also includes both positioning means 110 and 120 for the base bushing 10 and the fastening bushing 30. Furthermore, the first plasticizing means 230 as well as the corresponding generator 235 and the first moving means with the pneumatic cylinders 240 and 242 are provided.

The setting system 200 differs from the setting system 100 according to FIG. 7 by the fact that a second plasticizing means 250 with a second generator 255 is provided. With respect to the construction, the second plasticizing means 250 corresponds with the first plasticizing means 230, with each plasticizing means 230, 250 being assigned to a bushing 10, 30. In this way, the bushings 10, 30 can be heated independently from each other. Furthermore, a second moving means consisting of a further pneumatic cylinder 244 is provided, due to which the second positioning means 120 can be moved separately from the first positioning means 110.

The use of the setting system 200 generally corresponds with the use of the setting system 100. Differences arise by the fact that both bushings 10, 30 can be inserted into the component 1 separately from each other and that both bushings 10, 30 can be heated separately from each other. Therefore, the equipping of the second positioning means 120 with the fastening bushing 30 can also take place later or separately from the equipping of the first positioning means 110 with the base bushing 10.

FIG. 9 shows a third embodiment of a setting system 300. In contrast to the two above-discussed setting systems 100 and 200, the first plasticizing means 330 in this embodiment is no tube transducer but a surface converter or transducer. The surface transducer uses the same principle for heating the bushings 10, 30, it does however differ from the tube transducer in that it may comprise a ceramic pressure piece for transmitting an insertion force onto the bushings 10, 30. In particular, the surface transducer is designed such that it immerses into the base bushing 10 and by that co-heating the fastening bushing 30 that is arranged below. In this connection, the heating and insertion of the bushings 10, 30 may take place in one step. This setting system 300 may therefore be used in case of bigger base bushings 10 and fastening bushings 30.

A fourth embodiment of the setting system 400 is illustrated in FIG. 10. The setting system 400 includes a setting head 402, which is an automatic insertion head. In the automatic insertion head, the bushings 10, 30, which may be supplied automatically, are isolated or separated, in particular by means of a slide system. Subsequently, the bushings 10, 30 are heated in the above-described way, in particular by means of a tube transducer as the first plasticizing means and/or second plasticizing means.

The heated bushings 10, 30 are fed to a downpipe, via which the bushings 10, 30 fall into the setting position. By means of a subsequent punch, the bushings 10, 30 are then inserted into the component 1. In this connection, an approach can be realized, which first of all allows an insertion of the fastening bushing 30 and subsequently of the base bushing 10. In this case, an own downpipe as well as an own punch for inserting is intended for each bushing 10, 30, and the setting head 402 needs to be moved along only one axis in order to insert the base bushing 10 into the component after inserting the fastening bushing 30.

Finally, FIG. 11 shows a fifth embodiment of the setting system 500. In this setting system 500, two separate setting heads are provided which may be mounted in a way movable along one axis. The first setting head serves for inserting the fastening bushing 30 into the component 1 and comprises a second plasticizing means 550. In the illustration according to FIG. 11, this is the setting head illustrated on the right side.

The second setting head serves for inserting the base bushing 10 into the component 1. In a familiar way, it includes a tube transducer as the first plasticizing means 530, a corresponding generator 535 as well as two pneumatic cylinders 540 and 542. Thus, the first and the second setting head are constructed identically and adapted to the corresponding bushing 10, 30. After inserting the fastening bushing 30, the second setting head is arranged over the insertion portion such that the base bushing 10 is inserted coaxially with respect to the fastening bushing 30 into the component 1. Thus, this is a two-level or two-step insertion.

An embodiment of a manufacturing method for a component is shown in FIG. 12, in particular for an inventive component. In a first step A1, the component as well as a base bushing and a fastening bushing are provided. Alternatively, in a first step A2, already the component with fastening bushing molded therein and a separate base bushing are provided. It may be preferred that the base bushing with adjusting element arranged therein be provided. It may also be preferred that the base bushing without adjusting element arranged therein be provided.

Now, a direct or indirect plasticizing of the component in an insertion portion takes place until the material is plasticized at the position intended for an insertion of the base bushing and the fastening bushing (step B).

In the subsequent step C, the fastening bushing and/or the base bushing are inserted into the component, so that the fastening bushing and the base bushing are arranged coaxially with respect to one another in the component.

It becomes clear from the above explanations that in case of a component with fastening bushing already molded therein, the insertion of the base bushing takes place in a separate step. Even in case of a fastening bushing that has not yet been molded in, an insertion of the two bushings separately from and after each other can be realized. Alternatively, both bushings can also be inserted in one step, as is described above in connection with the setting systems.

Another embodiment of a manufacturing method for a component is described in connection with FIG. 13. Here, first of all, a mold for the component as well as a base bushing and fastening bushing is provided in step i. Then, in step ii, the base bushing and the fastening bushing are arranged coaxially in the mold on a core. Subsequently, the component material is inserted into the mold (step iii) and after cooling, the molded component with base bushing and fastening bushing molded therein is demolded (step iv).

Finally, FIG. 14 shows an embodiment of a fastening method for two components 1, 3 to one another. Firstly, either a first component 1 is provided with the first component 1 being a component according to the invention and an arranging of an adjusting element in the base bushing 10 takes place (step a1), or a first component 1 with adjusting element is provided (step a2). After that, a second component 3 is provided at a distance to the first component 1 (step b) and in step c, an inserting of a fastening screw 5 through an opening in the second component 3 into the adjusting element takes place, with the fastening screw 5 including an outer thread and an outer diameter which match the second inner thread and second inner diameter of the fastening bushing 30. Finally, in step d, a rotating of the fastening screw 5 takes place, which causes the adjusting element to be screwed out of the base bushing 10 until it comes into abutment with the second component 3, and then in step e, a further rotating of the fastening screw 5 takes place, so that the fastening screw 5 comes into engagement with the fastening bushing and both components 1, 3 are fixed at a distance to one another.

The invention claimed is:

1. A component with:
   a. a base bushing including a first axial end and an opposite second axial end as well as a first inner diameter, with the base bushing being provided with a first inner thread of a first thread direction, and
   b. a fastening bushing including a third axial end and an opposite fourth axial end as well as a second inner diameter, with the fastening bushing being provided with a second inner thread of a second thread direction that is opposite to the first thread direction, with
   c. the second inner diameter being smaller than the first inner diameter and
   d. the base bushing and the fastening bushing being separate elements and being arranged coaxially to each other in the component.

2. The component according to claim 1, in which the base bushing and/or fastening bushing include at least one, preferably completely circumferential, profiling at a radial outer side, in particular in form of a knurling or in form of rips.

3. The component according to claim 1, in which the base bushing is arranged adjacent to a surface of the component with its first axial end, in particular flush with the component surface.

4. The component according to claim 3, in which the third axial end of the fastening bushing is arranged adjacent to the second axial end of the base bushing and the fourth axial end of the fastening bushing preferably comprises a bottom, so that the fourth axial end is preferably closed and an opening of the fastening bushing is present only at the third axial end.

5. The component according to claim 1, with an adjusting element having a dragging element being arranged in the base bushing, the adjusting element including an outer thread matching the first inner thread of the base bushing, so that an automatic tolerance compensation of the distance to a second component is realizable.

6. The component according to claim 5, in which the base bushing comprises a first securing means and the adjusting element comprises a second securing means, with the first and the second securing means interacting with each other, particularly in the completely screwed-in state of the adjusting element, thus forming a transport and/or counter locking.

7. The component according to claim 5, in which the adjusting element consists of metal and/or the dragging element consists at least partially of plastic material, and/or with the material of the component comprising metal or plastic material.

8. A connection between a first component and a second component with a distance in between, with the first component being a component according to claim 5, and a head of a fastening screw is arranged adjacent to a surface of the second component which faces away from the first component, with an outer thread of the screw engaging with the second inner thread of the fastening bushing.

9. A Setting system for manufacturing a component according to claim 1, including:
   a. a first positioning means comprising a first outer diameter which matches an inner diameter of a base bushing, so that the base bushing, which comprises a first inner thread of a first thread direction, is positionable on the first positioning means, and
   b. a second positioning means comprising a second outer diameter which matches an inner diameter of the fastening bushing, so that the second outer diameter is smaller than the first outer diameter and the fastening bushing, which comprises a second inner thread of a second thread direction opposite to the first thread direction is positionable on the second positioning means, as well as
   c. a first plasticizing means, which directly or indirectly provides for a plasticizing of the component before and/or during an inserting of the base bushing and/or the fastening bushing into the component, and
   d. a first moving means with which the first positioning means and/or the second positioning means is movable, in particular along only one axis, and the base bushing and/or the fastening bushing are insertable into the component.

10. The setting system according to claim 9, in which the first plasticizing means operates with one of the following: electric field, magnetic field, ultrasonic, oscillations, thermal radiation or a combination thereof, and/or in which the first plasticizing means provides for a heating of the base bushing and which comprises a second plasticizing means which provides for a heating of the fastening bushing.

11. The setting system according to claim 9, in which the first and the second positioning means are arranged at a common setting head axially behind or downstream one another.

12. The setting system according to claim 11, in which the first and the second positioning means have an unchangeable position with respect to one another and are movable jointly by means of the first moving means or
   in which the setting system includes a second moving means, with the first positioning means being moveable by means of the first moving means and the second positioning means by means of the second moving means, so that the first and the second positioning means are moveable relatively to one another.

13. The setting system according to claim 9, in which the first and the second positioning means are arranged next to one another at a common setting head, or in which the first and the second positioning means are each arranged at a setting head.

14. The setting system according to claim 9, in which the base bushing is receivable on the first positioning means in a way sealed to the outside, so that in case of a later inserting, no component material can enter into the base bushing.

15. The setting system according to claim 14, in which the fastening bushing is receivable on the second positioning means in a way sealed to the outside, so that in case of a later inserting, no component material can enter into the fastening bushing at least over the third axial end.

16. The setting system according to claim 9, in which the base bushing and/or the fastening bushing are correspondingly held on the first and/or the second positioning means by means of: friction locking, in particular by means of a spring, negative pressure, adhesive, magnets or a suitable outer thread of the first and/or the second positioning means or a combination thereof.

17. The setting system according to claim 9, which furthermore includes a first detecting means for detecting an equipment of the first and/or the second positioning means with the base bushing and/or the fastening bushing.

18. The setting system according to claim 9, which furthermore includes a second detecting means for detecting a setting depth of the base bushing and/or fastening bushing into the component and/or with the first and/or the second moving means being a pneumatic cylinder.

19. A manufacturing method for a component according to claim 1, including the steps:
   a1. providing the component as well as a base bushing and a fastening bushing, or
   a2. providing the component with fastening bushing molded therein and a separate base bushing
   a3. inserting the fastening bushing and/or the base bushing into the component, so that the fastening bushing and the base bushing are arranged coaxially to one another in the component,
   wherein a setting system is used for at least part of the steps, the setting system comprising: a first positioning means comprising a first outer diameter which matches an inner diameter of a base bushing, so that the base bushing, which comprises a first inner thread of a first thread direction, is positionable on the first positioning means, and a second positioning means comprising a second outer diameter which matches an inner diameter of the fastening bushing, so that the second outer diameter is smaller than the first outer diameter and the fastening bushing, which comprises a second inner thread of a second thread direction opposite to the first thread direction is positionable on the second positioning means, as well as a first plasticizing means, which directly or indirectly provides for a plasticizing of the component before and/or during an inserting of the base bushing and/or the fastening bushing into the component, and a first moving means with which the first positioning means and/or the second positioning means is movable and the base bushing and/or the fastening bushing are insertable into the component.

20. The manufacturing method according to claim 19, which includes the following step before the inserting of the fastening bushing and/or the base bushing:
   c. direct or indirect plasticizing of the component in an insertion portion, until the material is plasticized at the position intended for an inserting of the base bushing and the fastening bushing.

21. The manufacturing method according to claim 19, with the inserting of the fastening bushing and the base bushing taking place in a common step or with the inserting of the fastening bushing and the base bushing taking place in two separate steps one after another.

\* \* \* \* \*